United States Patent
Riazzi et al.

(10) Patent No.: US 9,721,266 B2
(45) Date of Patent: *Aug. 1, 2017

(54) SYSTEM AND METHOD FOR CAPTURING INFORMATION FOR CONVERSION INTO ACTIONABLE SALES LEADS

(75) Inventors: Bob Riazzi, Austin, TX (US); Ken Hubacker, Cedar Park, TX (US); Bob Solnek, Austin, TX (US); Justin England, Austin, TX (US); Jerome Nolte, Austin, TX (US)

(73) Assignee: Reachforce Inc., Austin, TX (US)

( * ) Notice: Subject to any disclaimer, the term of this patent is extended or adjusted under 35 U.S.C. 154(b) by 859 days.

This patent is subject to a terminal disclaimer.

(21) Appl. No.: 13/447,039

(22) Filed: Apr. 13, 2012

(65) Prior Publication Data

US 2012/0232955 A1    Sep. 13, 2012

Related U.S. Application Data

(63) Continuation-in-part of application No. 12/617,556, filed on Nov. 12, 2009, now abandoned.

(51) Int. Cl.
*G06Q 30/02*    (2012.01)

(52) U.S. Cl.
CPC ......... *G06Q 30/0204* (2013.01); *G06Q 30/02* (2013.01)

(58) Field of Classification Search
CPC ........... G06Q 30/0203; G06Q 30/0204; G06Q 30/0201
USPC ..................................... 705/7.29, 7.32, 7.33
See application file for complete search history.

(56) References Cited

U.S. PATENT DOCUMENTS

| | | | | |
|---|---|---|---|---|
| 6,236,977 B1 * | 5/2001 | Verba | ..................... | G06Q 30/02 705/14.39 |
| 7,082,427 B1 * | 7/2006 | Seibel | ............... | G06F 17/30616 705/26.1 |
| 7,096,220 B1 * | 8/2006 | Seibel | ............... | G06F 17/30867 709/201 |
| 7,120,629 B1 * | 10/2006 | Seibel | ............... | G06F 17/30613 705/37 |

(Continued)

OTHER PUBLICATIONS

Reverse DNS lookup, Wikipedia webpages, retrieved from archives org, dated Jul. 24, 2008 https://web.archive.org/web/20080724142834/http://en.wikipedia.org/wiki/reverse_DNS_lookup.*

*Primary Examiner* — Octavian Rotaru
(74) *Attorney, Agent, or Firm* — Taylor Russell & Russell, P.C.

(57) ABSTRACT

The present invention relates to business-to-business marketing organizations who participate in lead-generation activities via their company website. More particularly, the invention provides a target lead-generation system and method that targets the right businesses using real-time predictive and behavioral analytics and website traffic data and connects businesses to potential customers and suppliers to drive business revenue. Even more particularly, the invention provides a system and method for real-time searching and matching of data input into website registration forms by website visitors, provides for real-time cleansing and appending of attribute rich company demographic and firmographic data to the website form and to the marketing database. The resulting information is then available for use by other systems such as marketing automation systems and CRM systems.

12 Claims, 23 Drawing Sheets

(56) References Cited

U.S. PATENT DOCUMENTS

| | | | | |
|---|---|---|---|---|
| 7,275,083 B1* | 9/2007 | Seibel | G06Q 30/02 | 705/14.39 |
| 7,315,861 B2* | 1/2008 | Seibel | G06F 17/30719 | 705/14.39 |
| 7,330,850 B1* | 2/2008 | Seibel | G06F 17/30616 | 709/203 |
| 7,376,714 B1* | 5/2008 | Gerken | G06Q 30/02 | 709/219 |
| 7,634,464 B2* | 12/2009 | Chen | G06F 17/30489 | 707/999.003 |
| 7,809,747 B2* | 10/2010 | Monro | G06F 17/30247 | 382/116 |
| 7,890,545 B1* | 2/2011 | Cason, Jr. | G06Q 10/06 | 707/803 |
| 2002/0087573 A1* | 7/2002 | Reuning | G06Q 10/06 | 707/999.102 |
| 2002/0156700 A1* | 10/2002 | Gray | G06Q 30/0641 | 705/27.1 |
| 2003/0177385 A1* | 9/2003 | Price | H04L 63/08 | 713/171 |
| 2004/0015580 A1* | 1/2004 | Lu | G06F 11/3495 | 709/224 |
| 2004/0205157 A1* | 10/2004 | Bibelnieks | G06F 17/30867 | 709/218 |
| 2004/0215793 A1* | 10/2004 | Ryan | G06Q 50/01 | 709/229 |
| 2005/0027717 A1* | 2/2005 | Koudas | G06F 17/30536 | 707/999.1 |
| 2005/0131760 A1* | 6/2005 | Manning | G06Q 30/0281 | 705/346 |
| 2005/0154615 A1* | 7/2005 | Rotter | G06F 19/322 | 705/3 |
| 2005/0234800 A1* | 10/2005 | Khusial | G06Q 20/20 | 705/37 |
| 2005/0246221 A1* | 11/2005 | Geritz, III | G06Q 10/10 | 705/7.33 |
| 2005/0246240 A1* | 11/2005 | Padilla | G06Q 10/06 | 705/26.3 |
| 2006/0184423 A1* | 8/2006 | Krishnamoorthy | G06Q 10/101 | 705/300 |
| 2006/0206344 A1* | 9/2006 | Au | G06Q 10/00 | 705/321 |
| 2006/0229896 A1* | 10/2006 | Rosen | G06Q 10/1053 | 705/321 |
| 2006/0242000 A1* | 10/2006 | Giguiere | G06Q 30/02 | 705/7.32 |
| 2006/0271526 A1* | 11/2006 | Charnock | G06Q 30/02 | 707/999.003 |
| 2006/0287937 A1* | 12/2006 | Flinn | G06Q 40/06 | 705/35 |
| 2007/0022011 A1* | 1/2007 | Altberg | G06Q 30/02 | 705/14.55 |
| 2007/0027746 A1* | 2/2007 | Grabowich | G06Q 30/02 | 705/14.4 |
| 2007/0073607 A1* | 3/2007 | Eydelman | G06Q 30/0241 | 705/37 |
| 2007/0100996 A1* | 5/2007 | Stebbins | G06Q 30/02 | 709/224 |
| 2007/0112582 A1* | 5/2007 | Fenlon | G06Q 20/10 | 705/39 |
| 2007/0156519 A1* | 7/2007 | Agassi | G06Q 40/02 | 705/14.53 |
| 2007/0162305 A1* | 7/2007 | Miller | G06Q 10/00 | 705/2 |
| 2007/0233561 A1* | 10/2007 | Golec | G06Q 20/10 | 705/39 |
| 2007/0233780 A1* | 10/2007 | Shevlin | G06Q 10/06 | 709/203 |
| 2007/0255614 A1* | 11/2007 | Ourednik et al. | | 705/10 |
| 2008/0140539 A1* | 6/2008 | Cividanes | G06Q 10/00 | 705/7.34 |
| 2008/0154625 A1* | 6/2008 | Serbanescu | G06Q 30/0601 | 705/26.1 |
| 2008/0162286 A1* | 7/2008 | Lieberman | G06Q 30/02 | 705/14.41 |
| 2008/0183525 A1* | 7/2008 | Tsuji | G06Q 10/063 | 705/7.18 |
| 2008/0201205 A1* | 8/2008 | Rose | G06Q 10/0631 | 705/7.13 |
| 2008/0205655 A1* | 8/2008 | Wilkins | G06Q 10/10 | 380/279 |
| 2008/0208947 A1* | 8/2008 | Shapira et al. | | 708/650 |
| 2008/0209024 A1* | 8/2008 | Shapira | G06Q 10/0637 | 709/223 |
| 2008/0228544 A1* | 9/2008 | Woosley | G06Q 10/1095 | 705/7.19 |
| 2008/0243526 A1* | 10/2008 | Nance | G06Q 30/02 | 705/1.1 |
| 2009/0037237 A1* | 2/2009 | Weber | G06Q 10/06 | 705/7.11 |
| 2009/0037828 A1* | 2/2009 | Waite | G06F 8/38 | 715/760 |
| 2009/0049299 A1* | 2/2009 | Jablon | H04L 9/0618 | 713/176 |
| 2009/0055251 A1* | 2/2009 | Shah | G06Q 30/0217 | 705/14.19 |
| 2010/0257351 A1* | 10/2010 | O'Connor et al. | | 713/150 |
| 2011/0258603 A1* | 10/2011 | Wisnovsky et al. | | 717/125 |
| 2012/0060097 A1* | 3/2012 | Dayon | G06Q 10/10 | 715/738 |
| 2012/0116982 A1* | 5/2012 | Yoshida et al. | | 705/304 |
| 2012/0197862 A1* | 8/2012 | Woytowitz et al. | | 707/710 |

* cited by examiner

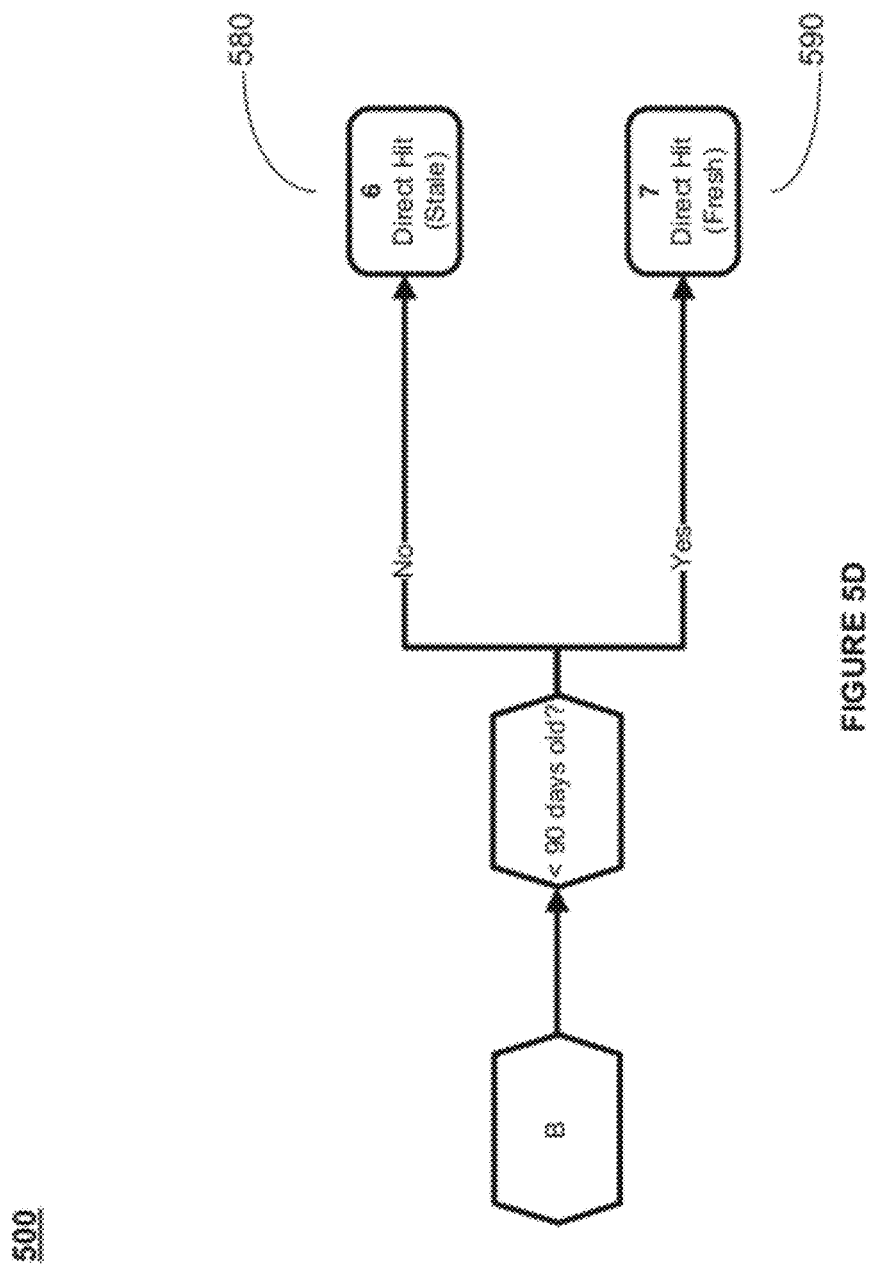

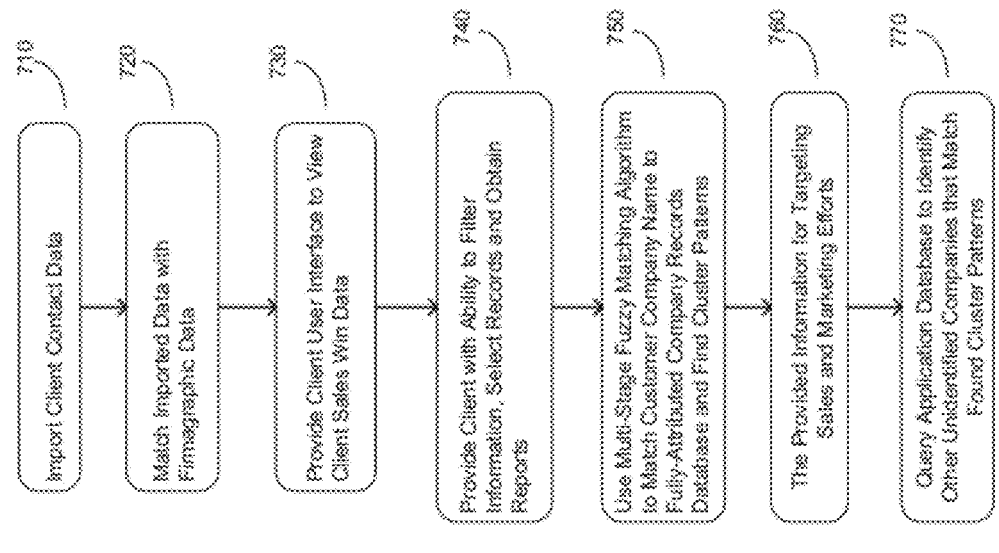
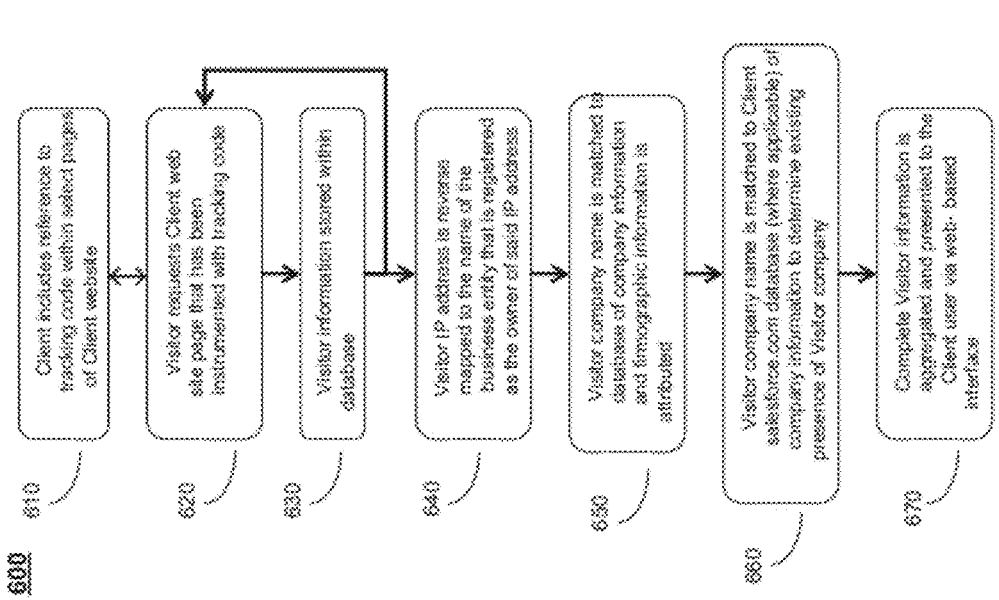

| | Incoming table values |
|---|---|
| First Name | joe |
| Last Name | Smith |
| Email | joe@company-a.com |
| Company | Company A Inc. |
| Address 1 | 555 Beale St. |
| Address 2 | |
| City | San Francisco |
| State | California |
| Country | USA |
| Postal Code | 94107-1922 |
| Phone | 415-555-1111 |
| Trade Style Name | |
| State Code | CA |
| Country Code | US |
| Employee Count | 15 |
| Annual Revenue | 1200000 |
| SIC | 7371 |
| SIC Industry Name | Custom Computer Programming Services |
| NAICS | 541511 |
| NAICS Sector Name | Custom Computer Programming Services |
| Company URL | www.company-a.com |
| Location Type | SL |
| RPJI Confidence | pass |

| | | | |
|---|---|---|---|
| Company | Company B, Inc | Company c, Inc | Company c, Inc |
| Address 1 | 5565 Hillview Ave | 555 South St | 555 South St |
| Address 2 | | | |
| City | Palo Alto | Hopkinton | Hopkinton |
| State | California | Massachusetts | Massachusetts |
| Country | USA | USA | USA |
| Postal Code | 94304-1383 | 01748-2230 | 01748-2230 |
| Phone | 650-555-1000 | 508-555-1000 | 508-555-1000 |
| Trade Style Name | | | |
| State Code | CA | MA | MA |
| Country Code | US | US | US |
| Employee Count | 9050 | 48500 | 48500 |
| Annual Revenue | 2657343000 | 17015126000 | 17015126000 |
| SIC | 7371 | 3572 | 3572 |
| SIC Industry Name | Custom Computer Programming Services | Computer Storage Devices | Computer Storage Devices |
| NAICS | 541511 | 334112 | 334112 |
| NAICS Sector Name | Custom Computer Programming Services | Computer Storage Device Manufacturing | Computer Storage Device Manufacturing |
| Company URL | | www.company-c.com | www.company-c.com |
| Location type | HQP | HQP | HQP |

SYSTEM AND METHOD FOR CAPTURING INFORMATION FOR CONVERSION INTO ACTIONABLE SALES LEADS

This application is a continuation-in-part of U.S. patent application Ser. No. 12/817,556, filed on Nov. 12, 2009, which is incorporated in its entirety by reference herein.

BACKGROUND

The present invention relates to business-to-business marketing organizations who participate in lead-generation activities via their company website. More particularly, the invention provides a target lead-generation system and method that targets the right businesses using real-time predictive and behavioral analytics and website traffic data and connects businesses to potential customers and suppliers to drive business revenue. Even more particularly, the invention provides a system and method for real-time searching and matching of data input into website registration forms by website visitors, provides for real-time cleansing and appending of attribute rich company demographic and firmographic data to the website form and to the marketing database. The resulting information is then available for use by other systems such as marketing automation systems and CRM systems.

Business to business marketing ("B2B") includes individuals and organizations that facilitate the sale of their products and services to other companies or organizations that often resell the products and services, or use them to support their own operations. Although the difference between consumer and business marketing may appear obvious, there are many distinguishing features between the two that often result in substantial differences in practice. For example, B2B marketing may often involve shorter and more direct channels of distribution. While consumer marketing often involves large demographic groups targeted through mass media and retailers, in B2B marketing the negotiation process between the seller and buyer is more personal in nature. Most B2B marketing includes a much more limited portion of promotional budgets dedicated to advertising than in consumer marketing. B2B marketing and sales is conducted through more direct promotional efforts, trade journals and sales calls. However, many of the principles of consumer marketing also apply to B2B marketing, such as defining target markets and matching product and service strengths to the defined target markets.

One of the more recent promotional endeavors of business marketing is through the Internet, involving offered services and products on organizations' websites. While popular in use, industry research has shown that of all persons who visit a B2B company's website, only 3% of visitors actively identify themselves via forms, thereby leaving 97% of web visitors to remain unknown. In addition, of the 3% that announce themselves, less than 15% fill out a form with complete and accurate information. This lack of information makes it very difficult to follow up a possible sales lead from a B2B website visitor based on insufficient information.

In addition to the need for information on businesses visitors to B2B sales and marketing websites to be provided to the sales and marketing funnel, quality data is needed by the business for use in marketing automation systems and customer relationship management ("CRM") systems.

CRM systems and methods are used by organizations to provide a predictable and organized way for interacting with customers and potential customers. CRM often includes specially trained personnel and special purpose software. It is a combination of policies, processes and strategies implemented by an organization to unify its customer interactions and provide a method for tracking customer information. It often includes technology for identifying and attracting new and profitable customers as well as creating better relationships with existing customers. CRM involves many organizational aspects that relate to one another, including front and back office operations, business relationships and interactions, analysis involving target marketing and marketing strategies, and means for generating metrics for measuring the relative success of various marketing and sales efforts. It is a key component of modern marketing organizations. CRM systems include firmographic data, which includes characteristics of an organization often used for segment market analysis.

Marketing automation systems and methods are used by organizations to communicate with prospects and customers and automate many marketing communication tasks. Marketing automation often includes specially trained personnel and special purpose software. Whereas a CRM system is often leveraged as a database for the sales organization, a marketing automation solution is mostly leveraged as a database for the marketing organization. Furthermore, there is typically a link that exists between a marketing automation solution and a CRM system. Marketing automation is often leveraged to communicate with customers and prospects via email, track and report on campaign responses, profile the quality and sales-readiness of leads generated by marketing programs, prioritize which leads are passed to members of a sales team, and to automate ongoing communications to prospects not yet ready to purchase.

Therefore, quality data from customers is needed to be able to leverage and exploit marketing automation systems and CRM systems. One of the major drawbacks of many of the B2B sales and marketing products available today is the lack of data quality when generating existing and new customer contact data. A problem for B2B marketers is that a large gap exists between the need to capture rich business demographic and firmographic from new leads that complete online registration forms, and the need to keep registration forms short to reduce form abandonment. B2B marketers need accurate and comprehensive data to route leads to the right sales representative, segment & target their marketing efforts, and perform other lead prioritization and communication activities. At the same time, marketers also need to increase as much as possible the number of website visitors from their marketing programs who fill out their registration forms. Marketers have been forced to choose between shortening their registration forms to drive higher conversions (registrations), or require the registrant to complete too many fields, resulting in increased registration abandon rates and an increased average cost-per-lead.

Other challenges with registration forms are that the data that result after a customer/visitor enters information is often false or inaccurate data. This may be that a visitor makes errors providing its data, or may not know the correct answers required by the registration form. Another key challenge is identifying the true leads from spambots, automated computer programs designed to assist in the sending of spam that crawl Internet websites looking for registration forms and automatically enter fake data. Once a spambot finds a form, it parses and analyzes the form. The spambot then may fill them with unwanted information, hyperlinks and visuals that are intended to attract a target audience. This is often done to increase the number of hyperlinks to a particular web site, to boost its search engine ranking.

Addressing all of these above-mentioned challenges has required manual efforts on the part of marketing organizations to sift through all of the forms submissions and attempt to correct inaccurate firmographic details and eliminate the false records. Manual methods of correcting inputted form data can be time consuming and can result in lost customer leads. If the marketing organization takes too long to qualify the leads, potential new customers may have already identified and elected to purchase the product or service being offered from another vendor which responds more quickly.

B2B marketing is at the beginning of a new era that heavily relies on the tight integration of inbound and outbound marketing initiatives. As this transformation happens, marketers need help increasing their conversions and accelerating their leads through the marketing and sales funnel for faster revenue growth. However, a huge gap exists between the need to capture rich business firmographic information from new leads, and the need to keep registration forms short. Marketers are forced to make a lose, lose decision: shorten their registration forms to drive higher conversions, but go without critical information, or require the registrant to complete too many fields, resulting in increased rates of abandonment of the web form entry by the registrant resulting in a higher cost-per-lead. Rich data attributes are required by their sales and marketing systems, as well as the critical customer and prospect insight needed to better manage opportunities through the sales and marketing funnels.

An ideal solution is one that provides as close to 100% accurate company information for a business visitor to a website. Such a solution is not trivial since less than 3% of website visitors are identified. Drawbacks of previous solutions include outdated and inaccurate information and the lack of a simple and cost-effective way to objectively and analytically identify and connect visitors with their companies so as to be able to target such companies for outbound marketing.

A solution is required that enables companies to accelerate conversions through their sales and marketing funnels by reducing the amount of information that a company requests on the web forms while appending the data needed to run their business behind the scenes and in real time. In doing this, customers see a sharp reduction in web-form abandonment leading to a significant increase in the percentage of visitors who progress through the registration cycle.

The solution presented herein is a multi-pronged approach that can leverage visitor-selected information, and/or IP address identification of the visitor, and/or a process that automatically matches company demographic and firmographic information to the company of a website visitor leveraging complex matching algorithms and a master data management platform. The result is a shortened registration form that delivers, invisibly to the website registrant, all of the information a marketer needs to run their business. Companies that have implemented the solution provided herein can achieve a more than a 50% increase in web-form completion and conversion rates and achieve more than a 30% reduction in their cost per lead.

It is also important to offer such solutions as Software as a service ("SaaS"). SaaS is a model of software deployment where a provider licenses a software application to customers for use as a service on demand. SaaS vendors may host an application on their own web servers or download the application to the customer device, disabling it after use or after an on-demand contract expires. By sharing end user licenses and on-demand use, investment in server hardware may be reduced or shifted to a SaaS provider. SaaS is usually associated with business software and is considered to be a low cost method for businesses to obtain rights to use software as needed rather than licensing all hardware devices with all applications. On-demand licensing provides the benefits of commercially licensed use without the associated complexity and potentially high initial cost of equipping each hardware device with software applications that are only used occasionally.

SUMMARY

The present invention is a system and method to selectively identify and target marketing activities to the set of companies from which web visitors are originating but whose visitors do not actively identify themselves to the sponsoring website company. It performs as a Software as a service (SAAS) deployment.

Features of the described application for identifying website visitors includes the means of a small code fragment that can be embedded in a client's website for collecting and sending and tracking non-personally-identifiable information about passive web visitors by the present invention. As this passive web visitor data accumulates, the client can then view this data as well as other publically available company information, set up business rules to view and filter companies based on a number of visits, pages visited and firmographic criteria, such as industry, revenue range and employee population size.

The present invention is also a targeted lead generation system, which uses a combination of analytical applications to assist B2B marketers in identifying ideal markets and companies within those markets to target their lead generation efforts. The B2B marketing economy in 2005 was seventy seven billion dollars with almost two thirds of that amount spent in field marketing and demand generation. The top issue for companies trying to market to other businesses is reaching the correct buyer decision maker, often called a target. Billions of dollars are wasted annually in unsuccessful marketing attempts to reach the right target. Despite annual spending in 2005 of twenty seven billion dollars on demand generation activities such as email marketing, webinars, search marking and online advertisements, B2B marketers still experience zero to three percent conversion rates that is being able to reach the right target. Other related problems involve inability to measure marketing results, improving lead quality and generating more leads.

The present invention addresses the B2B marketing data gap in part by providing high quality data for B2B demand generation. A typical supply chain view of B2B marketing involves lead generation and marketing and sales force automation as part of customer relationship management which also includes customer service and support. It provides intelligence to automate and streamline lead generation and marketing and sales force automation.

The present invention solves the marketing problems of targeting the right companies with marketing and sales campaigns, targeting the right roles of likely decision makers, identifying the right segments of the market where a company is currently winning customers, identifying the deal velocity of opportunities through the sales funnel, identifying patterns in the opportunities in the sales funnel, identifying companies with the same characteristics as other companies that the business is selling to and justifying marketing spending by measuring results. It solves these problems with analytics and algorithms that target the right businesses and the right roles of likely decision makers and buyers within those businesses. Included is a custom developed workflow engine that leverages a company's internal data and third party data. Data services for targeted lead generation include custom data creation services using a role-base model of the decision maker, marketing leads, a discovery data inference engine and workflow to drive advantaged economics of data services and a data refresh and update database service for in-house leads and customer contact data. Software services for marketing decisions include targeting campaigns based on win and sales funnel analysis, leveraging web site visits and converting them into targeted leads and profiling of in-house data to surgically fix data quality issues. In summary, the present invention helps businesses target the right companies to sell to, reach the right person within those companies and connect to those persons in the right way most likely to generate a positive response.

The core of these marketing service applications is a platform for marketing and sales contact management that provides increased data quality. These include a SaaS-based data services technology platform that provides the following features.

Real-Time Predictive Analytics—Automatically recommends new target businesses based on "cluster patterns" identified via real-time analysis of client wins data and sales pipeline data within CRM systems and/or web visitor profiles.

An innovative Role-based data model for contact records, which can pinpoint accuracy of the right contact. This Role-based data model employs cutting-edge Web 3.0 semantic data principles to provide a unique capability for identifying the right person based on the Role of an individual aligned with a company's product/solution value proposition.

An on-demand contact discovery model based on intelligent heuristics in which contact data is generated only upon client request, resulting in fresh, 100% accurate contacts that drive performance increases of 20×-30× for marketing campaigns.

A real-time query engine technology component that will enables queries across social network destinations and augment the traditional contact data attributes, such as name, title, phone, email, with social media presence information. This "query for quorum" approach not only serves as an additional tier of contact validation but will also assist clients in formulating social marketing strategies to reach their prospects by identifying if and where those prospects are participating in social networking.

Providing Real-Time Firmographic Information Based on Minimal Web Form Input Embodiment An alternate embodiment of the present system and method solves the problem of not having quality data from website visitors/customer may not accurately identify themselves to the sponsoring website company. The present system and method provides sponsoring companies with real-time attribute rich company firmographic data based on minimal web form input data entered by their website visitor and whose visitors may not have accurately identified themselves on the web form. The present invention addresses the B2B marketing data gap by providing high quality data for B2B demand generation. It solves the marketing problems of targeting the right companies with marketing and sales campaigns by allowing its users to selectively identify and target marketing activities to the set of companies associated with the web visitors. The resulting computer system and method may be deployed as a Software as a Service (SAAS).

Features of the described application for providing company firmographic data include a relatively small code fragment or software client that is embedded in a sponsoring company's online web form. This software client utilizes the website visitors' responses to company based input criteria to perform internet protocol (IP) address-to-company searches, fuzzy criteria searches, and/or analytical criteria matches based on statistical scoring algorithms. These real-time searching and matching modules each utilize combinations of multiple input parameters to provide highly accurate results. Standardized company firmographic data, such as physical address, industry, revenue range, and employee size are appended in real-time to the web form as the result of a successful search or match allowing the results to be immediately available to customer marketing automation systems, CRM systems or both upon initial data entry. An available module allows for real-time visitor email address verification. An available module allows for CASS verification of physical address information wherein the geographic attributes of each contact are validated against third party services to ensure accuracy and deliverability for direct mail.

The core of the described application includes a SaaS-based data service technology platform that provides the following modules and associated functionality:

Application Client with Automated Workflow—

This application client provides a configurable software application client which effectively eliminates a significant portion of custom coding required by the sponsoring company for a successful deployment. This allows for the non-technical staff to have a working implementation in place extremely fast, decreasing time to market and reducing implementation cost. In addition, the application client coordinates the actions of the modules of the system and method described herein and their interaction with at sponsoring company's existing web form. As web visitor data accumulates, the application client allows for the viewing of this data as well as other publicaliy available and proprietary company information, provides the ability set up business rules to view and filter companies based on a number of visits, pages visited and firmographic criteria, such as industry, revenue range and employee population size.

Real-Time Reverse IP Address Searches—

This application provides the functionality for detecting the IP address of a web form visitor, reverse mapping that IP address to a company, and then providing that company's firmographic data in real-time to the form. This allows the sponsoring company to auto-detect the visitors company and auto-populate the form data with or without direct interaction from the visitor.

Real-Time Company Searches—

This application provides the functionality for utilizing a web visitor's company data entered in a form to be used in a multi-stage fuzzy search conducted at a SaaS provider's Real-Time Search Database. The attributes of the visitor's company are used to fuzzy search commercial databases of company information. Such commercial databases may be located locally to the firmographic analytical system or may be an external commercial database, or both. Combinations of multiple input variables can be used all of which are assigned unique precedence and weight values to be utilized by the fuzzy-search algorithm. The initial search is highly targeted. If no results are returned after this initial search, subsequent searches use fewer and fewer company attributes for a broader search until a result set is found. When using the Application Client, results of a company are presented to the visitor in an interactive select list allowing the visitor to select the exact company they are employed by. This interactive select list is configurable allowing multiple display options including an inline drop-down mode which displays results with each key-stroke of the visitor and a modal confirmation dialog box mode which displays results once the visitor completes the form. Upon a visitor selecting a company presented in the select list, the selected company's firmographic data is provided to the form where it updates hidden fields created so that the system and method receives this real-time search data.

Real-Time Company Matching—

This application provides the functionality for utilizing a web visitor's company data entered in a form to be analyzed remotely at the SaaS providers master data management (MDM) database utilizing a matching engine where matching is conducted via statistical scoring algorithms against a commercial database of company information. Combinations of multiple input variables can be used which are all assigned unique precedence/weight values to be utilized by the MDM matching algorithm. Company firmographic data from the best match(es) is provided to the form in real-time along with a score which indicates the confidence level of the match(es). This operation can be completely hidden from the web visitor.

Real-Time Email Address Validation—

This application provides the functionality for utilizing an intelligent scoring-based proprietary set of Internet research techniques to improve upon existing commodity methods, which generates a validation score for each email address.

Real-Time CASS Address Verification—

This application provides the functionality for allowing the geographic attributes of each delivered company to be validated against third party services to ensure accuracy and deliverability of direct mail. The CASS software function corrects, matches and standardizes street addresses.

An embodiment of the present invention comprises a real-time software application method hosted on a server for capturing information for conversion into actionable sales leads. It comprises collecting website visitor information in real-time via a communication network when a website visitor accesses a web form on a third-party company website. Visitor information is imported in real-time to a firmographic analytical application running in real-time on the server and comprising the steps of: mapping a visitor's IP address to a name of a visitor company owner of the IP address; matching web form data entered data by the visitor to visitor company owner firmographic attributes and information in a commercial database; validating visitor email address and returning a validation score; validating geographic address attributes of the visitor company owner; aggregating and sending visitor company owner firmographic information to the visitor's browser to be displayed on the visitor's web form; and sending and appending visitor company owner firmographic data to the visitor's web form.

BRIEF DESCRIPTION OF DRAWINGS

These and other features, aspects and advantages of the present invention will become better understood with regard to the following description, appended claims, and accompanying drawings wherein:

FIG. 7 is a flow diagram of an embodiment of a method for identifying and associating information from web services with information from a client's customer relationship management system;

FIG. 8 depicts a client user interface for analyzing client wins data;

FIG. 18 shows a block diagram of the real-time address validation function;

FIG. 21 is an exemplary depiction of the output of the real-time company matching function described FIGS. 13, 15A, 15B and 17; and FIG. 22 is an exemplary depiction of the output of the real-time company matching function and real-time company search function described in FIGS. 13, 15A, 15B and 17.

DETAILED DESCRIPTION OF INVENTION

Figure 1:
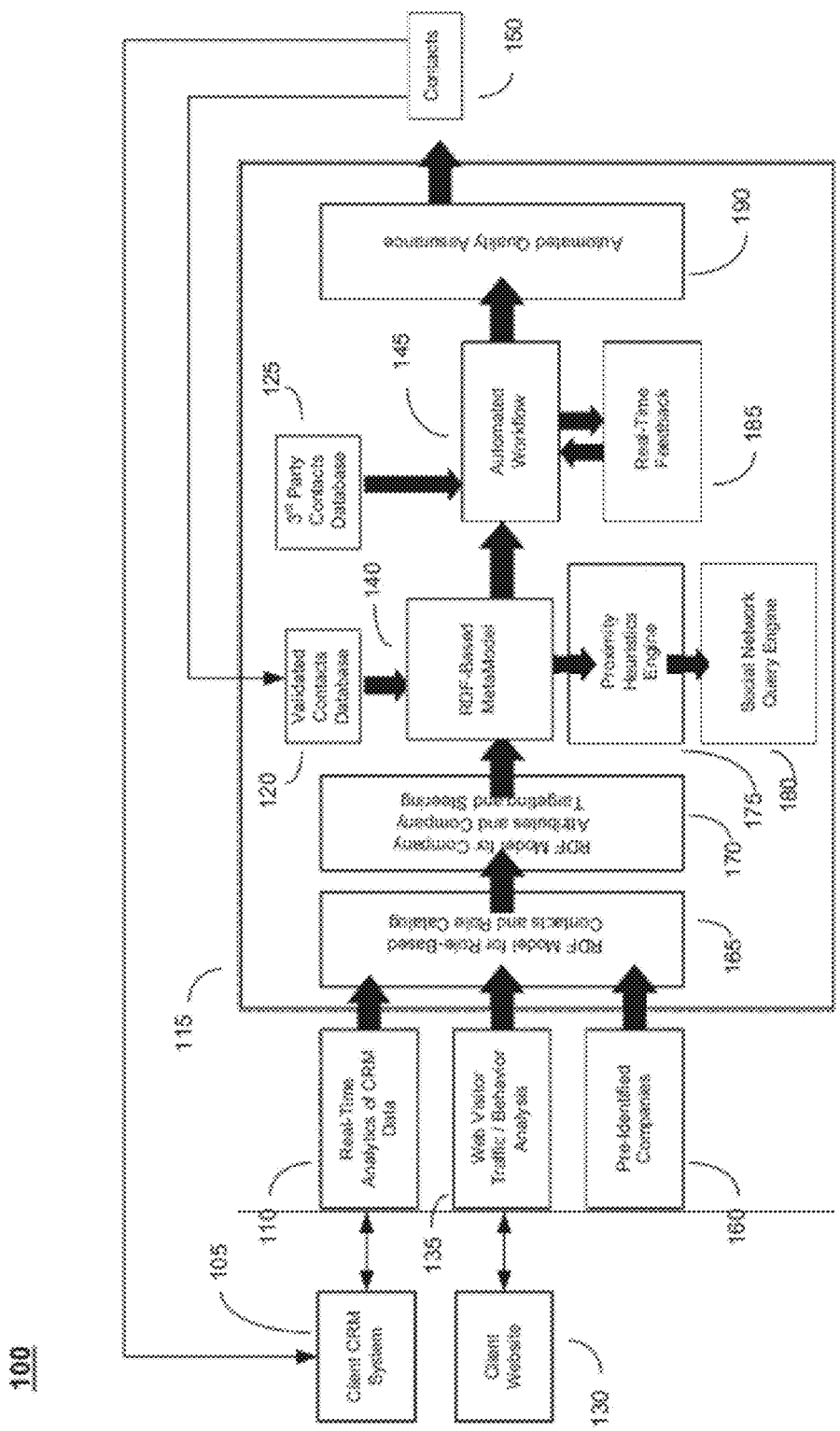
FIG. 1 illustrates a functional block diagram of an embodiment of the present invention.

Turning to FIG. 1, FIG. 1 illustrates a functional block diagram 100 of an embodiment of the real time analytics application 110, web visitor application 135, and the data services platform 115. It provides a targeted lead-generation system that targets the right businesses using website traffic data for reaching the right business buying person via role-based contact data and connects businesses to potential customers and suppliers to drive business revenue.

Real-Time Analytics

In FIG. 1, a Customer Relationship Management (CRM) System 105 is a hosted software application as a service (SaaS) instance of a type of sales force automation software including but not limited to salesforce.com software. This CRM application 105 is used by the client as a system of record for tracking sales and marketing data, such as leads, contacts, accounts, opportunities and client wins. Client CRM data 105 is accessed by the real time analytics application 110 for creating a list of companies within which contacts and sales leads are desired. The real time analytics application 110 includes a set of self-service analytics tools that enable clients to create target company lists based on objective criteria, such as a client's CRM system. A more detailed description of this real time analytics application 110 is discussed below in relation to FIG. 7.

Web Visitor Application

FIG. 1 also includes a web visitor application 135 that receives data from client website visitor information from a code segment embedded in the client website 130. This web visitor application 135 is provided for clients who wish to focus their contact discovery efforts on companies that are frequenting their corporate website 130. This application 135 employs reverse-IP address lookup technology to identify, from an IP address of a client website visitor, the name of the company to which the IP address belongs. From there, a multi-stage matching algorithm is used to augment each reverse-mapped company name with firmographic information. A client user can then sort, filter and prune through the full list of visiting companies to identify a target set that matches their needs and provide that list to the data services platform as a target list. A more detailed description of this web visitor application 135 is discussed below in relation to FIG. 6.

It should be noted that at times clients will have a prepared list of companies 160 or are able to express the firmographic characteristics of the types of companies they are intending to target. In these cases, the companies or parameters are input to a list building tool provided as a part of the data services platform functionality.

Role-Based Contact

As shown in FIG. 1, target company data from the real time analytics application 110, the web visitor application 135, and the pre-identified companies 160 may be provided to the role-based contacts component 165. With a target company list identified, the next step is selecting the right role description by the role-based contacts component 165, or modifying one from the role catalog 165. A role description is an English-language definition of job function that makes a target contact ideal for the client's marketing requirements. To illustrate, roles can typically be described by completing the following sentence:

We are targeting the person responsible for _____.

It is often the case that this role description is augmented with supplementary bounding information around suggested titles and departments to specifically seek and/or avoid. An example of this more sophisticated description would be:

We are targeting the person responsible for _____. This person is typically in the _____ or _____ department and may carry the title of _____ or _____. This person must explicitly not reside in the _____ or _____ department and must not bear the title of _____ or _____.

This vernacular is often foreign to marketers whose innate response when questioned about who they are targeting is a title-based response, such as "the VP of Sales" or "Director of IT". The role catalog 165 assists clients in reshaping their thinking around roles instead of titles, which are poor predictors of the job functions a person actually performs. The role catalog 165 is a unique hybrid-Resource Description Framework ("RDF") 140, a semantic data representation of stored information that contains mappings of titles to roles. A more detailed description of this RDF model 140 for role-based contacts 185, 170 is discussed below in relation to FIG. 2.

Company Targeting

Once the target company list 110, 135, 160 and roles 165 have been identified, the contact discovery process is then initiated and several technology components are employed to maximize the leverage of existing information around titles, roles, companies and contacts to drive discovery costs downward. These components are company targeting and steering component 170 and the proximity heuristics engine component 175. The company targeting and steering component 170 is described in greater detail below in relation to FIG. 3. This component 170 steers a list of target companies by searching for companies that intersect between the client-defined criteria set and companies previously researched that are contained in the validated contact database 120. Where contacts match a target company and a role criteria, the result is considered a "direct hit".

Proximity Heuristics

The proximity heuristics engine component 175 relies on an underlying data model of the data services platform 115 that is an intelligent model that draws upon the Classifier and Statistical Learning methods of artificial intelligence. This model increases accuracy and relevance, i.e. "gets smarter", as more data is created within it. Information about all dimensions of the data produced, such as titles, roles, companies, contacts, are leveraged for present and future contact production, refresh or verification cost advantages. When a target role enters the system at a discovery initiation point, the system employs a heuristic statistical distribution model to match, correlate and provision existing contacts that directly match or are in close proximity to a desired role as determined either by existing role or title. Where existing contacts directly match or are in close proximity to a desired role within a defined threshold, the match is considered to be "correlated". The proximity heuristics engine component 175 is described in greater detail below in relation to FIG. 4.

Automated Workflow

As noted above, where contacts match a target company and a role criterion, the result is considered a "direct hit", and where existing contacts directly match or are in close proximity to a desired role within a defined threshold, the match is considered to be "correlated". For the remainder set of target companies where "direct hit" or "correlated" contacts were not found, the data services platform 115 provides an automated workflow 145 that guides researchers through the explicit set of process steps and transitions required to find or refresh the right role-based contacts. The automated workflow component 145 is described in greater detail below in relation to FIG. 5. The real-time feedback component 185 is a non-automated function of the data services platform 115.

Validation and Quality Assurance Technologies

As contacts are successfully discovered, the data services platform 115 employs a host of processes and automated quality assurance technologies 190 delivered within the contact manufacturing line to ensure that a contact is, in fact, the right contact and that the information that has been provided about the contact is accurate. Every contact that is released to clients undergoes the following automated verification and validation processes:

Email Address Validation— the system employs an intelligent scoring-based proprietary set of Internet research techniques to improve upon existing commodity methods, which generates a score for each email address in the range of [0 . . . 5]. Only contacts with email addresses scoring a 4 or 5 rating will be released to the client.

CASS Address Verification— the geographic attributes of each contact are validated against third party services to ensure accuracy and deliverability for direct mail performance.

Search engines and other Internet resources, such as LinkedIn, FaceBook and others are used to further verify that the contact exists at the stated company and that they fulfill the target role description.

Event logging produces forensics data enabling QA resources to validate that the appropriate steps were taken to discover and validate contact data and role applicability.

In-stream title analysis ensures contacts with titles that fail out of desired specification do not proceed through the workflow.

Dual-stage quality processes ensure role attribution and physical contact data are correct for each contact through VOIP call recording analysis, optimized web search tools and logging.

Taken together, these processes are effective in ensuring delivery of a high quality contact. The data services platform includes a real-time social network query engine component 180 to further these quality assurance methods by interrogating social network destinations to test for contact presence. The contacts 150 identified as a result of the automated workflow component 145 and the automated quality assurance component 190 are stored in the contacts database 120 of the data services platform 115 and in the clients' CRM systems.

Reporting and Instrumentation

The Data Services Platform requires a low skill barrier to usage and productivity. Contact discovery projects are delegated, monitored, tracked and measured throughout the process lifecycle by Project Managers. Researchers are provided with a rigid process flow that navigates them through the various stages of contact discovery and provides various means of assistance throughout the process.

The system is instrumented pervasively for reporting and analysis across several dimensions including quality, milestone achievement, productivity, performance, and capacity and revenue forecasting. Project Managers and Executives have access to real-time business intelligence that provides for facilities such as:

Researcher efficiency grading, enabling managers to monitor, guide and take steps to improve individual researcher performance Project and Agent level KPIs, enabling managers to guide projects to completion faster with less error.

Stage-level cycle-time analysis, illustrating areas of the 'manufacturing line' which need staffing modifications to ensure faster throughput.

Role penetration analysis, enabling determination of Role definition performance Assignment and reallocation of researchers to activities aligned with their skill levels Dynamic adjustment of capacity for active researchers within and across research centers Production capability and planning, enabling managers to scale resource needs to match production needs and capabilities.

Revenue forecasting, enabling managers to make intelligent planning decisions in real-time Reject analysis to surface error cluster trends, enabling in-process changes to project definitions and attainment of velocity and quality goals while reducing effort and opportunity waste.

Productivity hotspots, enabling managers to scale down research resources during slow periods and anticipate potential performance bottle necks.

Figure 2:
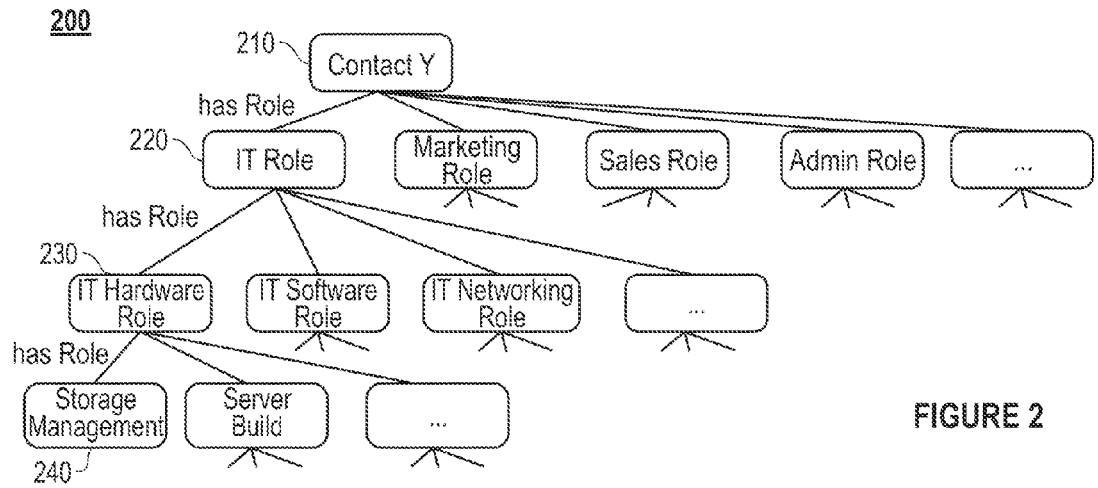
FIG. 2 is an example illustration of a Resource Description Framework model for role-based contacts.

Turning to FIG. 2, FIG. 2 is an example illustration of a Resource Description Framework model and role catalog 200 for role-based contacts. Contact Y is first identified 210 and has an IT role 220, an IT hardware role 230 and an IT storage management role 240. The role catalog 165 contains mappings for thousands of unique roles, spanning unique titles across a universe of over 600,000 contacts in the contact database 120. This catalog is text-indexed for search purposes and is used to illustrate the role paradigm to clients and prompt them to either select an existing role or modify an existing role.

In cases where neither a match nor template can be found that is similar enough to the client's role, the client can create a new role which will be used for their contact discovery purposes, thus extending the role catalog for future use. Once the target company list and roles have been identified, the contact discovery process is then initiated and several technology components are employed to maximize the leverage of existing information around titles, roles, companies and contacts to drive discovery costs downward. These components include the Company List Steering and the Proximity Heuristics Engine.

Figure 3:
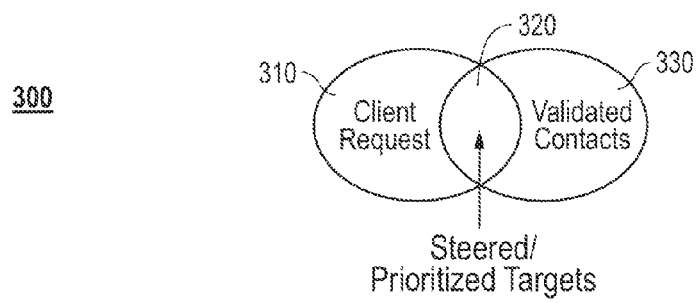
FIG. 3 is a depiction of the confluence of a client request and the validated contacts database.

Turning to FIG. 3, FIG. 3 is a depiction 300 of the confluence 320 of a client request 310 and a validated contacts database group 330. In cases where the clients either have firmographic criteria that describes the set of companies they wish to target or are open to supplementing an explicit list of target companies with additional companies matching a set of firmographic criteria, the data services platform 115 is able to "steer" the resulting target list of companies by searching for companies that intersect between the client-defined criteria set and companies previously researched, and therefore contain existing contacts. This advantages the discovery process, at a minimum, by surfacing a set of companies for which has known good contacts that match the client's target role description. In the optimal case, contacts that match both the target company and Role criteria are rendered, resulting in a "direct hit". In the event of a "direct hit" where the contact validation date is beyond a stated aging threshold of 90 days, the data services platform 115 will not automatically provision that contact directly to the client. Instead, the data services platform will conduct a faster, lower cost refresh process to verify that the contact data and role responsibility is still current before shipping it to the client.

Figure 4:
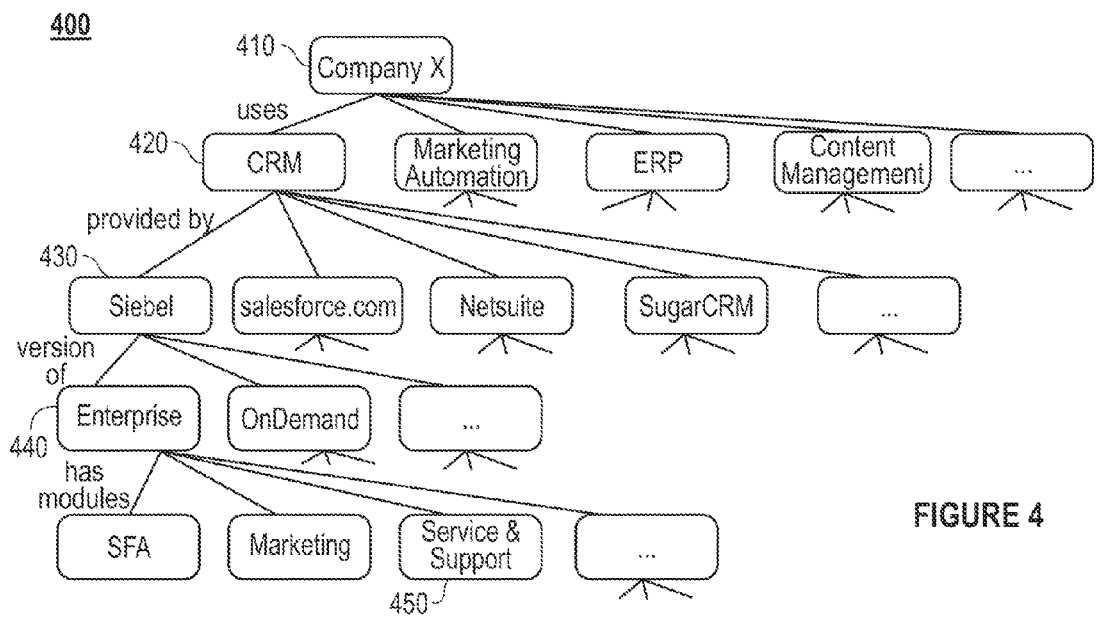
FIG. 4 is an illustration of a Resource Description Framework model for company attributes.

Turning to FIG. 4, FIG. 4 is an illustration 400 of a Resource Description Framework model for company attributes and company list steering 170. In the example of FIG. 4, Company X 410 uses a CRM system 420, provided by Siebel 430, a version of Enterprise 440 Services and Support 450. The underlying data model of the data services platform is an intelligent model that draws upon the Classifier and Statistical Learning methods of artificial intelligence. This model increases accuracy and relevance (i.e. "gets smarter") as more data is created within it. Information about all dimensions of the data produced by the data services platform, including titles, roles, companies, contacts, which are leveraged for present and future contact production, refresh or verification cost advantages. When a target role enters the system at the discovery initiation point, the system employs a heuristic statistical distribution model to match, correlate and provision existing contacts that directly match or are in close proximity to a desired role as determined either by existing role or title. If the number of times $Title_{Tx}$ occurs for Role$_{Ry}$>=Threshold on, the engine infers that Title$_{Tx}$ is a likely candidate to match the target Role$_{Ry}$. Depending on the depth of information around the target titles and roles, the system may derive several such titles for a given request. In circumstances where the specific role for a target company is not found but contacts exist, the correlation engine can determine if any of those contacts perform or are likely to perform the desired role. This engine can correlate role-to-title relationships even when the list of target companies varies significantly in size or revenue.

The hybrid-Resource Description Framework (RDF) data model also supports tagging of company attributes outside of the stock firmographic criteria. Information about technologies deployed within companies and other internal characteristics are persisted and stored in a hybrid-RDF format for advanced company data mining. The heuristics engine can not only predict likely titles for desired roles, but also identify which companies are most likely to employ people with those desired roles. Capturing the knowledge of relationships between roles and companies drives more precise targeting and selection of companies.

Figure 5A:
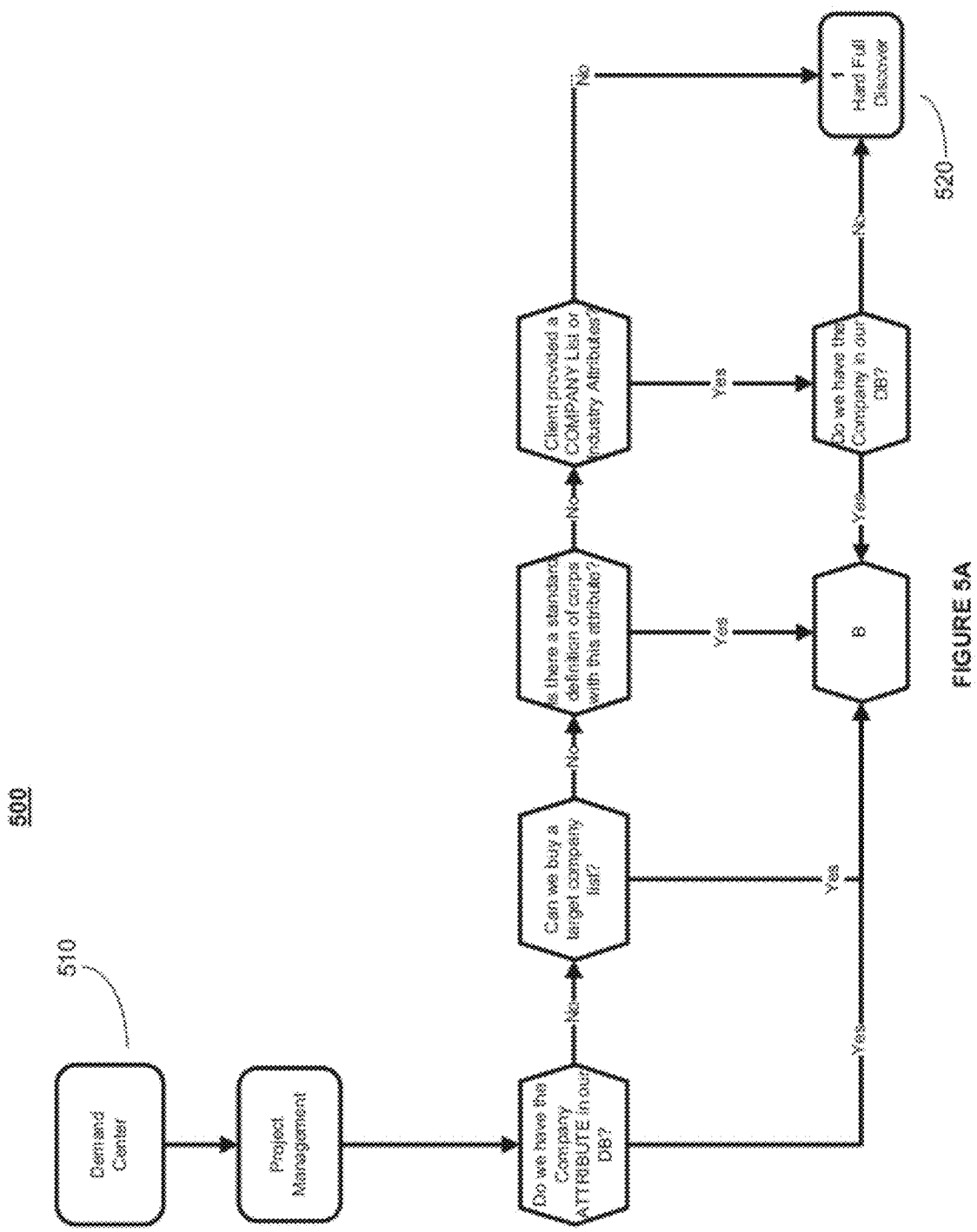
FIG. 5 is a flow diagram of workflow with adaptive steering where "direct hits' or "correlated" contacts are not found.
Figure 5B:
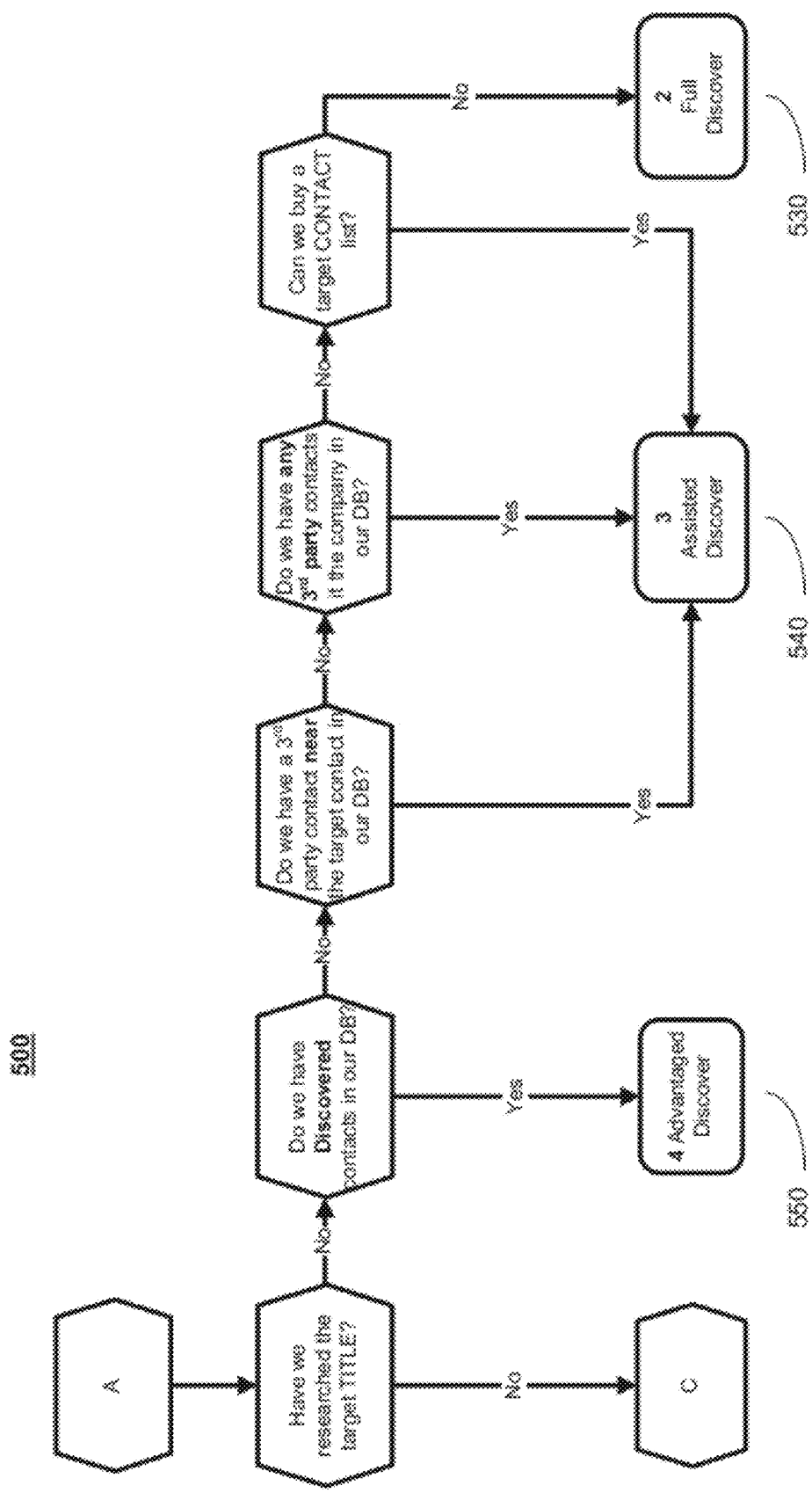
Figure 5C:
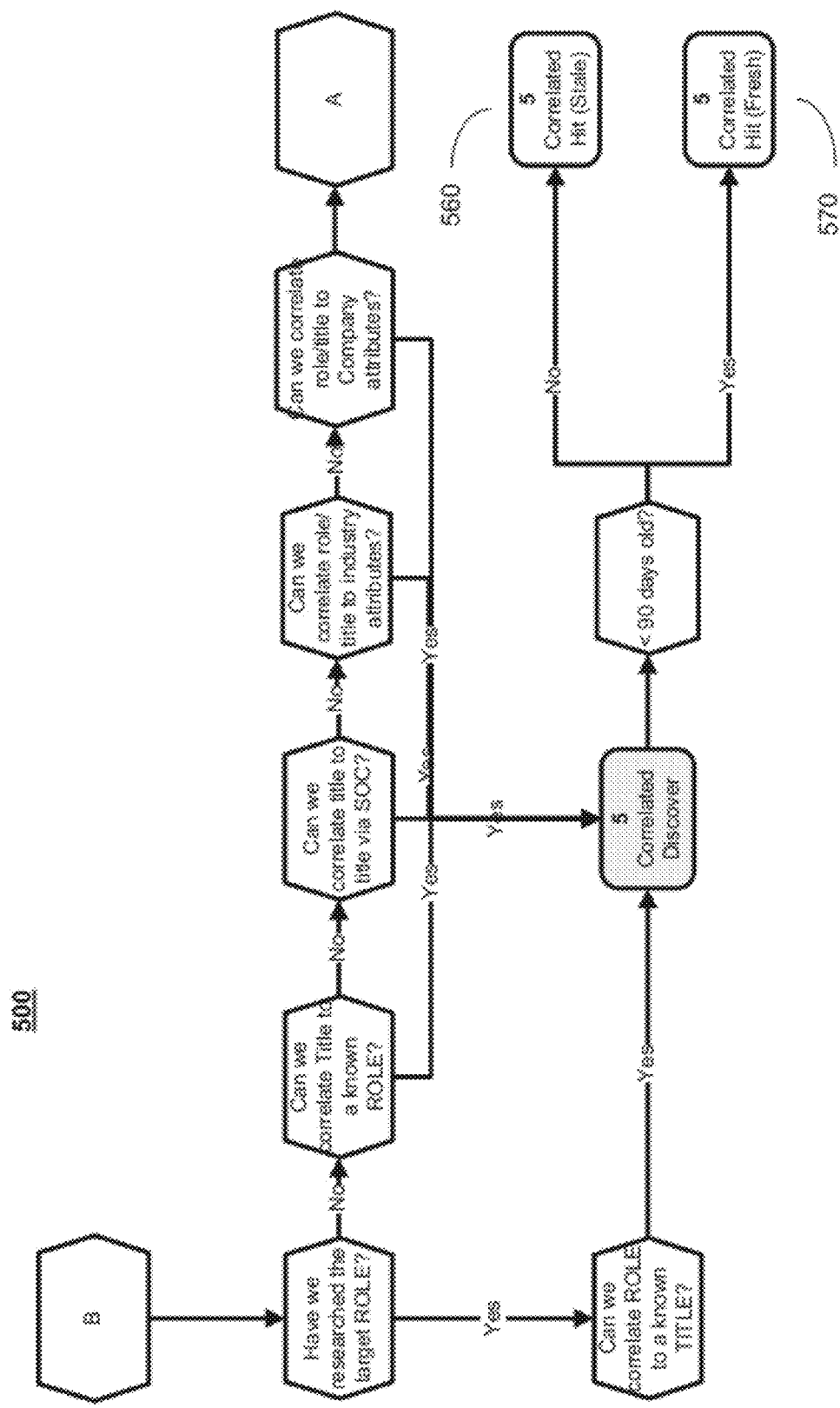

Turning to FIG. 5, FIG. 5 is a flow diagram of workflow 500 with adaptive steering where "direct hits" or "correlated" contacts are not found. Where "direct hit" or "correlated" contacts were not found, the Data Services Platform provides an automated workflow that guides researchers through the explicit set of process steps and transitions required to find or refresh the right role-based contacts. FIG. 5 depicts a receipt of contacts 510 where "direct hits" or "correlated" contacts are not found. It shows the steps of the workflow process 500 that transform the received contacts 510 into a Hard Full Discover 520, a Full Discover 530, an Assisted Discover 540, an Advantaged Discover 550, a Stale Correlated Hit 560 (over 90 days since refreshed), a Correlated Hit 570, a Stale Direct Hit 580 (over 90 days since refreshed), and a Direct Hit 590. To assist researchers in their efforts to locate the target role-based contacts, the system once again leverages the Proximity Heuristics Engine 175 to query third party contact data sources 125 for contacts at the target company, at a minimum, and, where possible, likely to be in proximity to the desired contact based on title. As the discovery process operates, the system provides real-time feedback mechanisms to researchers that indicate which characteristics of their delivered contacts (ex. titles, departments) are resulting in higher approval rates. This enables researchers with in-process discovery items to hone their efforts and adapt their discovery tactics to produce higher yields and higher quality contacts that align to the clients' requirements.

Figure 8:
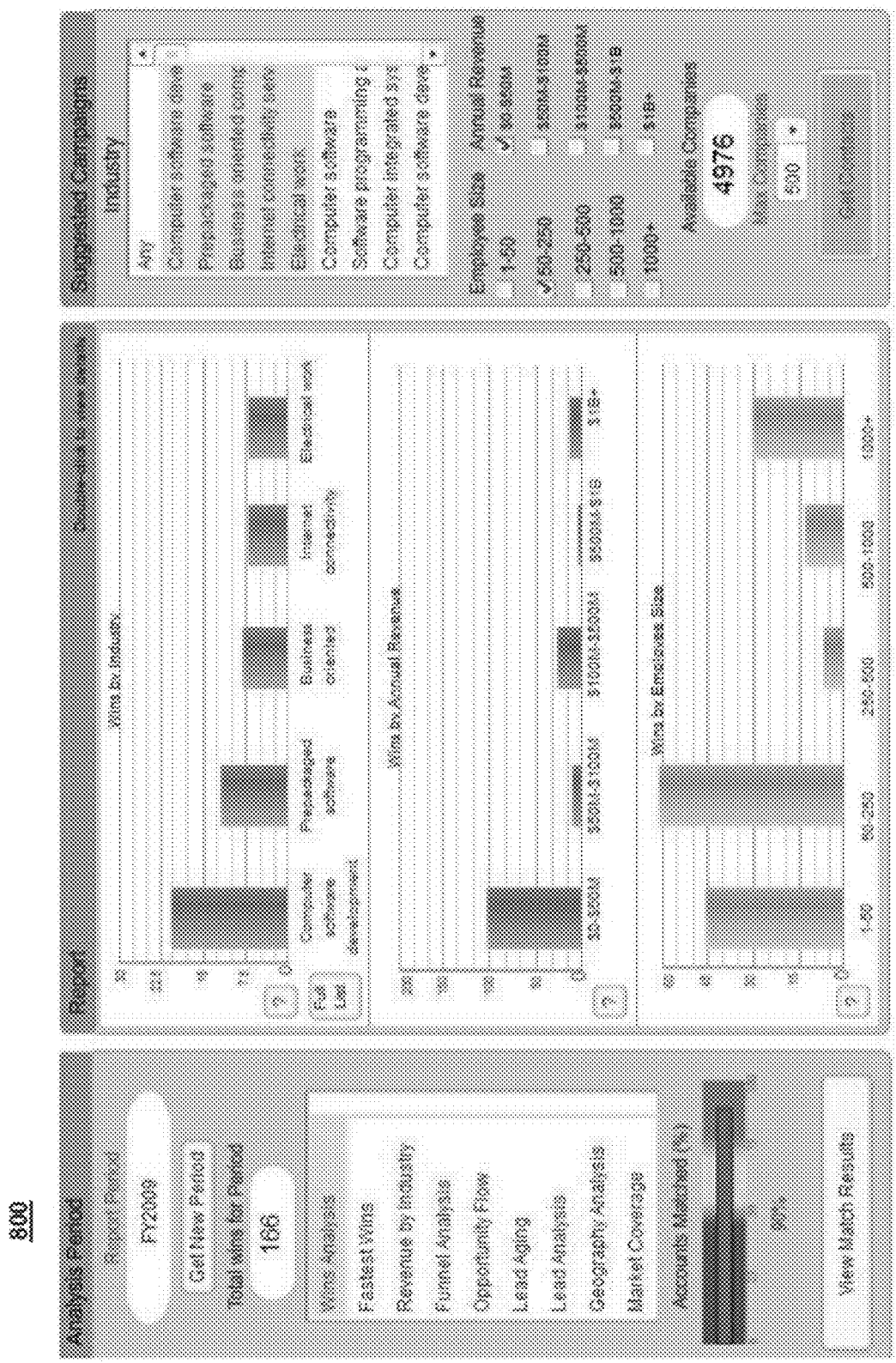
FIG. 8 is a flow diagram of an embodiment of a method for collecting and analyzing visitors of companies' websites.

Turning to FIG. 8, FIG. 6 is a flow diagram of an embodiment of a method 600 for collecting and analyzing visitors of companies' websites. The web visitor application 600 (135 in FIG. 1) provides for enabling the selective identification and targeting of marketing activities to the set of companies from which web visitors are originating but whose visitors do not actively identify themselves to the company. The client is provided a small code fragment 610 to be embedded in the client's website that will capture and send non-personal visitor information to a data capture service provided by the web visitor application (135 in FIG. 1). Once the code fragment is in place, as visitors arrive on the pages of the client's website that have been instrumented with the code fragment, information about the visitor is transmitted to the web visitor application 620. The information that is transmitted is the entire set of fields and values provided via the HTTP Request Header as specified via the HTTP protocol specification and does not include any personally identifiable information about the visitor, such as the visitor's first and last name, phone number or email address. This information is stored within a database accessible by the web visitor application 830. On a periodic basis, a scheduled program automatically processes all the web visit data for the current accumulation period and resolves collected IP addresses from the website visit information into the names of the business entities from which the visit originated 640. If no business entity name can be found for a given IP address or the IP address resolves to an Internet Service Provider (ISP), such as roadrunner.com, aol.com, yahoo.com, the visit record is excluded from rendering by the user interface. After the business entity name has been resolved, an attempt to match each business entity name against a database containing company names and firmographic information, such as industry, revenue and employee population size, is performed 650. For business entities that are matched successfully, the source record is attributed with the corresponding industry, revenue and employee population size values 660. If a match cannot be found, the business entity record is excluded from rendering by the user interface. Usenet an IP address, the system can render the name of the company and the company's firmographic attributes which can then be used by the system to identify similar companies with like attributes. The system can then find the right people to target within those companies along with their contact information. This process and functionality continues and repeats for the duration that the code fragment 610 remains on the client website. To retrieve the processed and attributed visitor data, the client is provided with a web-based user interface 670 to access stored visitor data originating from the code fragment as described previously. This user interface enables the user to select a timeframe of visit data to analyze and renders the visit data accordingly. The data is rendered in two views; one graphical depiction showing concentrations of visitor data by company headquarter location and industry, and one non-graphical table view of the visitor data and its associated attributes. Users of the Customer Relationship Management (CRM) systems that automate sales automation such as salesforce.com are also presented with the option to perform a proxy login to their respective sales force automation account (see 105 in FIG. 1) to enable the system to perform an analysis of which visiting companies are present within the user's sales force automation CRM database.

Turning to FIG. 7, FIG. 7 is a flow diagram of an embodiment of a method for identifying and associating information from web services 700 with information from a client's customer relationship management system. The purpose of this contact discovery process is to create a list of companies within which contacts are desired. The data services platform provides a set of self-service analytics tools that enable clients to create target company lists based on objective criteria, such as client's CRM system. This analysis assumes very little data integrity within the user's CRM system and only the names of the companies identified in the user's CRM system as either clients or active prospects are used to initiate the segmentation process. It is through the means of a multi-stage fuzzy matching algorithm that the application matches the user's company names to fully-attributed company records in the master database. The results of this analysis are then aggregated and the user is presented their "cluster patterns", or firmographic descriptions of companies which the user's customers and/or prospects are found to be in highest concentration. Once these cluster patterns are ascertained, the application then queries the database to surface the number of other companies that match the identified cluster patterns that the user does not currently have resident in their CRM system, thus presenting the remaining total addressable market available for a particular cluster pattern. This list of companies derived from this process then serves as the input list of target companies within which the contact discovery processes is performed. The process comprises importing client contact data from the client's CRM system 710 and matching the imported data with firmographic data 720. The client is provided with a user interface to view client wins data 730 (see FIG. 8), and allows the client the ability to filter information, select records and obtain reports 740. A multistage fuzzy matching algorithm is used to match customer company names to a fully-attributed company records database and find cluster patterns 750. The user interface provides information for targeting sales and marketing efforts 780 and allows a user to query the application database to identify other unidentified companies that match the found cluster patterns 770.

Table 1, shown below, depicts the ability of a user to select a set of companies or the entire list of companies for examination. The user can also filter the list of companies by industry, revenue, employee population, location or any combination thereof. The user may also elect to export the active list, which results in the creation of a tab-delimited text file on a server containing all respective information for each selected company. This file can then be harvested by a human employee and either processed in the context of a discover data services project or simply made available to the user via email attachment.

TABLE 1

| Company | Industry | Revenue | Employees | Location | Visits | In CRM |
|---------|----------|---------|-----------|----------|--------|--------|
| C1 | I1 | R1 | E1 | HQL1 | N1 | True/false/— |
| C2 | I2 | R2 | E2 | HQL2 | N2 | True/false/— |
| ... | ... | ... | ... | ... | ... | ... |
| Cn | In | Rn | En | HQLn | Nn | True/false/— |

Figure 9:
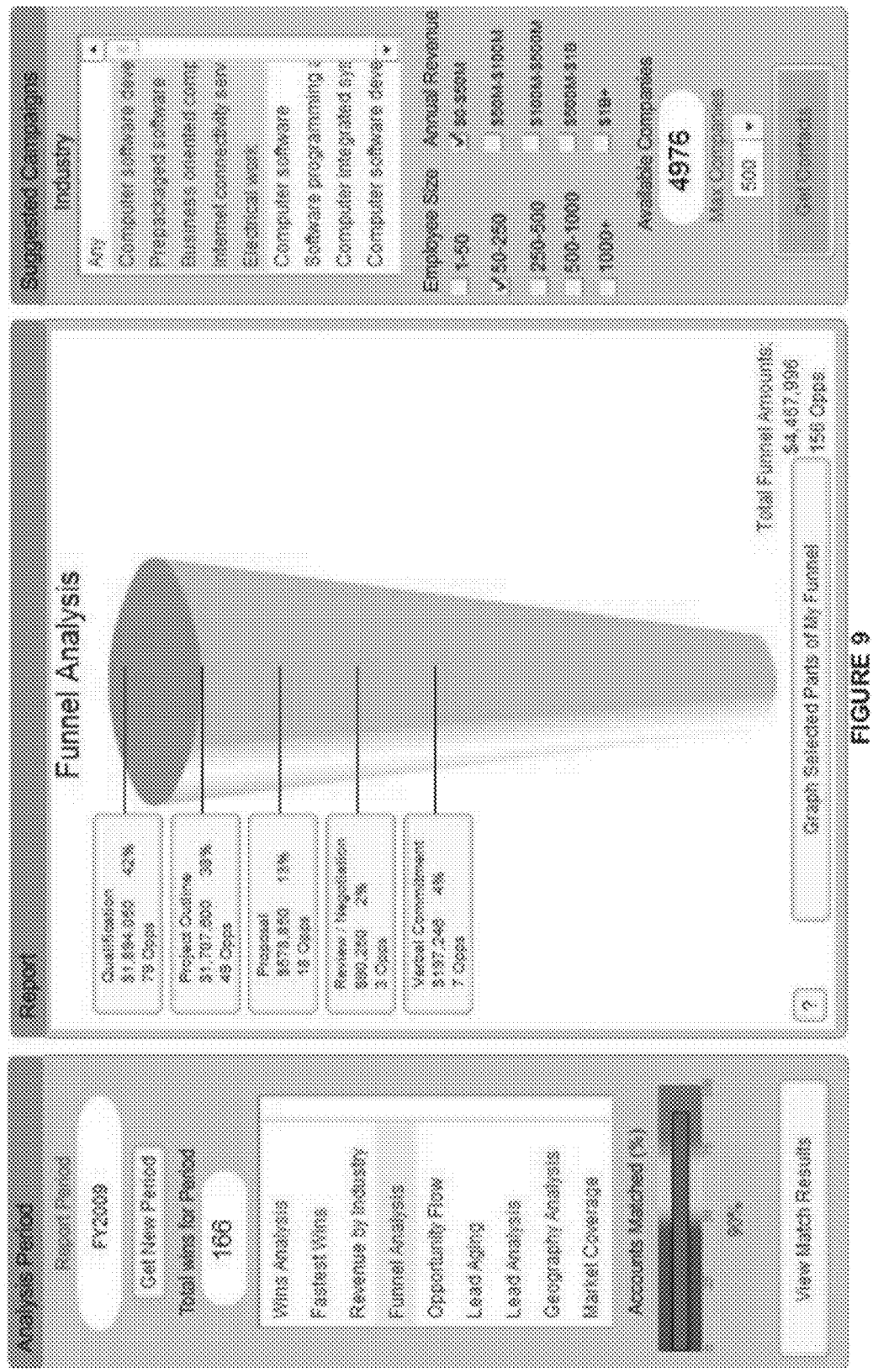
FIG. 9 depicts a client user interface for analyzing client funnel data.

Turning to FIG. 8 and FIG. 9, FIG. 8 and FIG. 9 depict a client user interface for analyzing client wins data, where FIG. 8 depicts selection of wins analysis 810 and FIG. 9 depicts selection of funnel analysis 910. This SAAS application analyzes, augments and reports on "in-funnel" sales data, turning static information into actionable campaigns based on current deal flow. It allows a company to determine if they are marketing to the right companies, identify trends in a sales funnel that a company is not capitalizing on, identify the kinds of leads that move through the sales funnel the fastest and generate the most revenue, all of which are common questions marketers ask themselves as they are developing lead generation programs. The information that results from this application allows marketing and sales teams to agree on winning target markets and focused lead generation efforts at other companies that match this profile. In addition to highlighting winning market segments, the application allows marketing and sales teams to look into their sales funnel and identify current trends. By analyzing opportunities in the sales funnel in real time, marketers can adjust programs on-the-fly to help keep deals moving to close.

The application provides a snapshot of a company's winning market segments and the activities that contributed to these wins.

As shown in FIG. 8, a client wins analysis allows a client to highlight Winning market segments, identify how many more companies have similar profiles to winning segment, highlight new client wins with the shortest sales cycles, pinpoint the kinds of companies that move through the sales funnel the fastest, and allows marketing and sales teams are able to better target outreach efforts. FIG. 9 illustrates how a client may use a funnel sales analysis to understand patterns within opportunities in the active sales funnel, better forecast new client wins, focus efforts on industries that are driving the most revenue for the business, and create or adjust marketing programs to help move opportunities to close. These figures provides identification of the set of companies that match the desired profile, and the system shown in FIG. 1 provides additional data services for role-based contact discovery within these new target companies. The combination of the application shown in FIG. 8 and FIG. 9 with the data services, allows marketing and sales teams to ensure they are reaching out to not only the right businesses but also the right decision making roles within those businesses.

Figure 10:
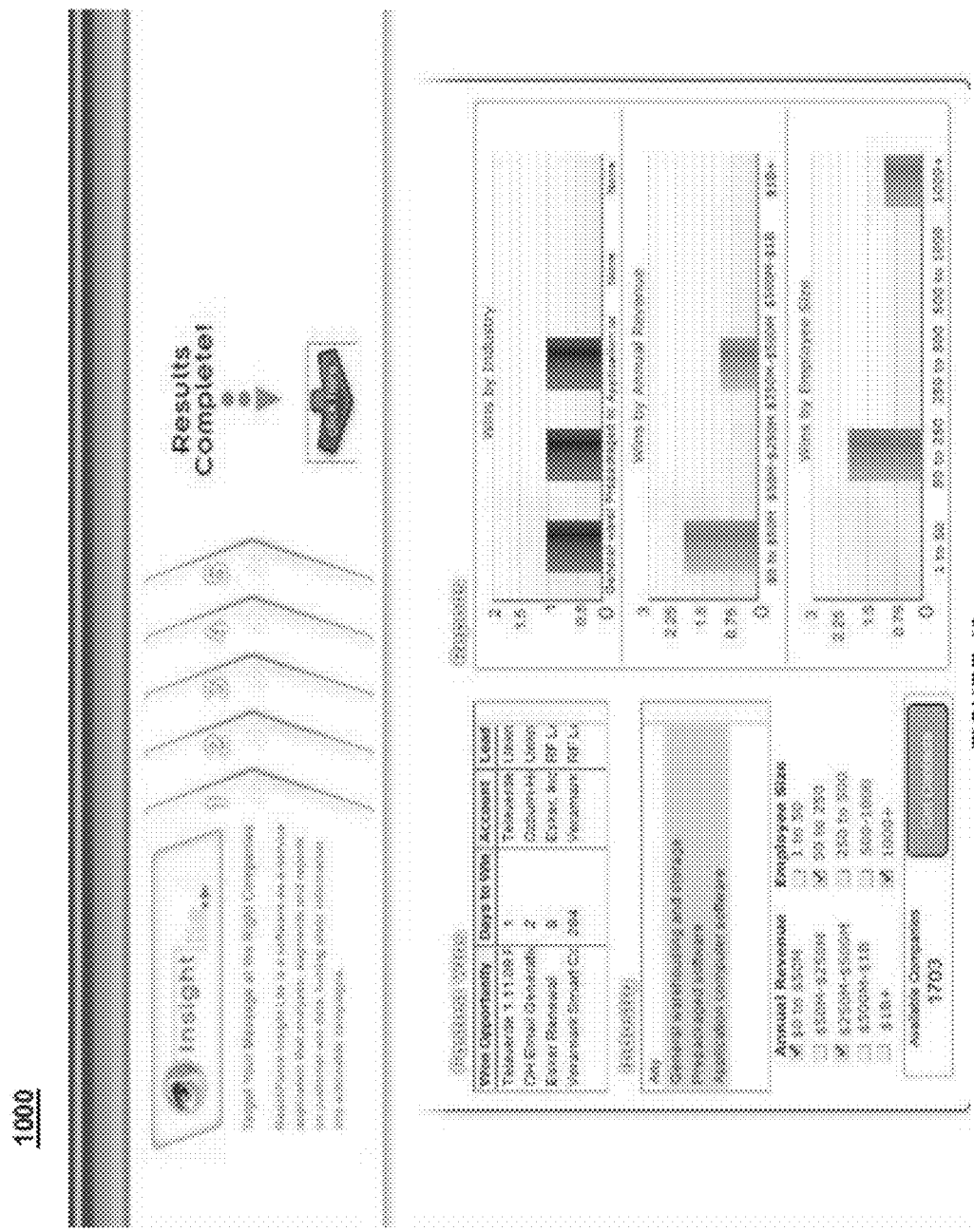
FIG. 10 depicts a client user interface for analyzing client fastest wins data by industry, annual revenue and employee population size.

Turning to FIG. 10, FIG. 10 depicts a client user interface 1000 for analyzing client fastest wins data 1010 by industry, annual revenue and employee population size. This feature enables greater efficiencies is increasing the velocity of wins.

Figure 11:
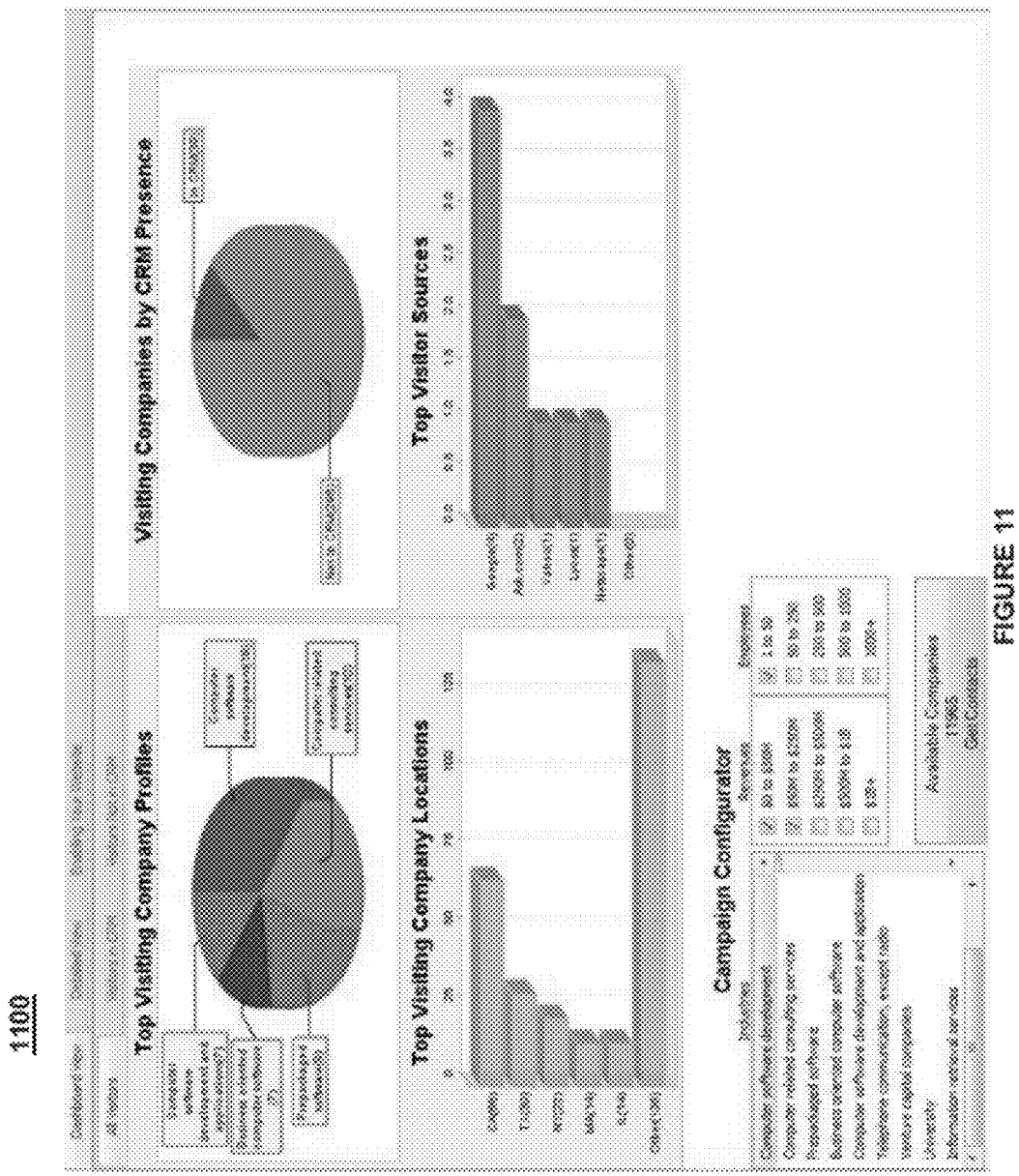
FIG. 11 depicts a client user interface dashboard view for proactively targeting lead generation.
Figure 12:
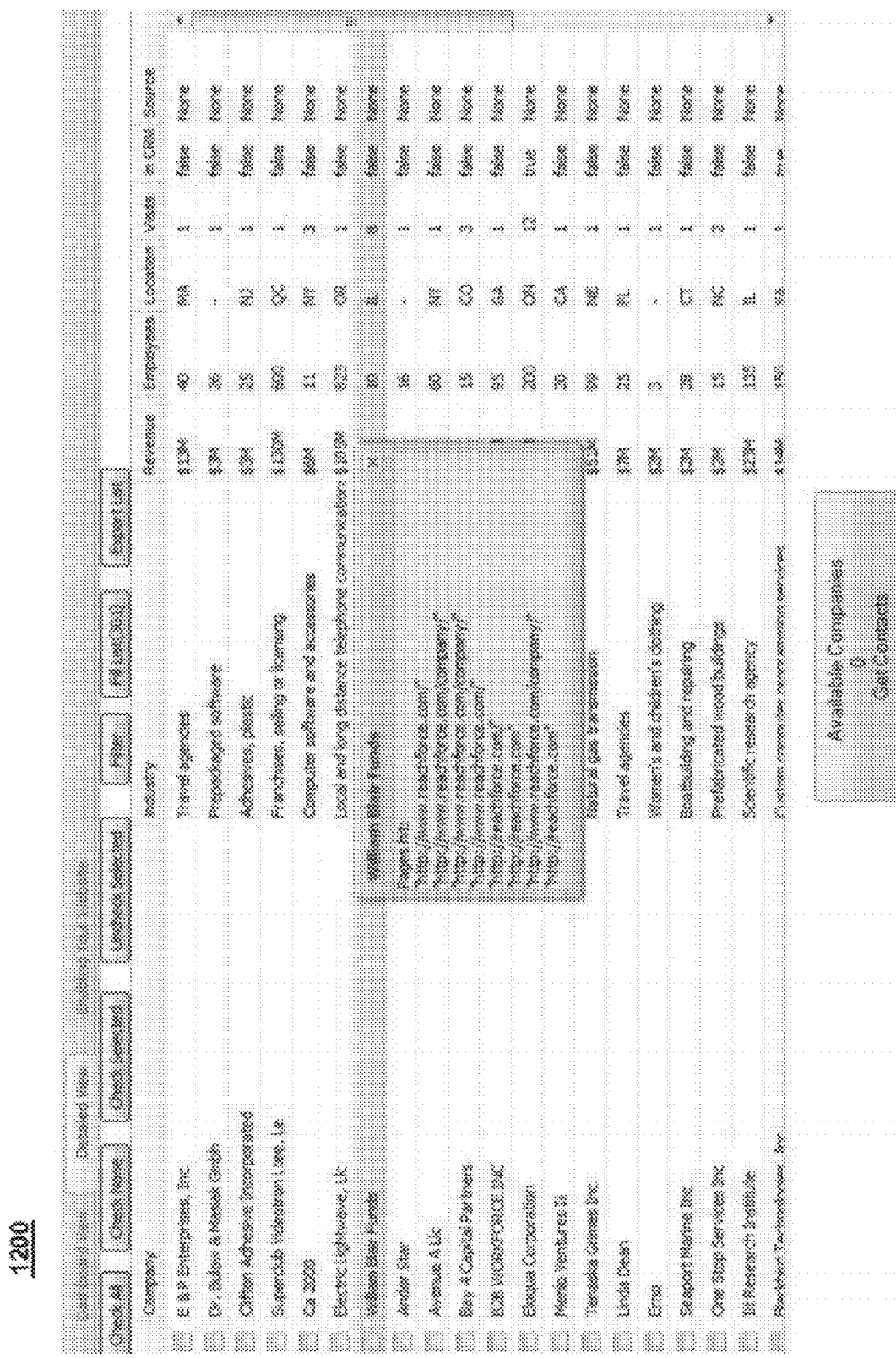
FIG. 12 depicts a client user interface detailed view for proactively targeting lead generation.

Turning to FIG. 11 and FIG. 12, FIG. 11 depicts a client user interface 1100 dashboard view 1110 for proactively targeting lead generation and FIG. 12 depicts a client user interface 1200 detailed view 1210 for proactively targeting lead generation. These user interfaces provide for setting up business rules to select, filter, review, prioritize and potentially score visitors based on the companies that are visiting, number of visits, pages visited and time on website and proactively targets unannounced web visitor. They provide reporting on where inbound visitors are coming from, such as search engines, blogs, email campaigns, as well as where the companies are geographically located. They also enable profiles of top visitors by industry and appends these records with industry verticals, SIC codes, revenue aid employee population size. With this data, a company can better target unannounced visiting companies but also get contacts from companies with similar profiles. Once the companies that are visiting the website unannounced have been identified, the system shown in FIG. 1 provides data services for role-based contact discovery within these new target companies.

Figure 13:
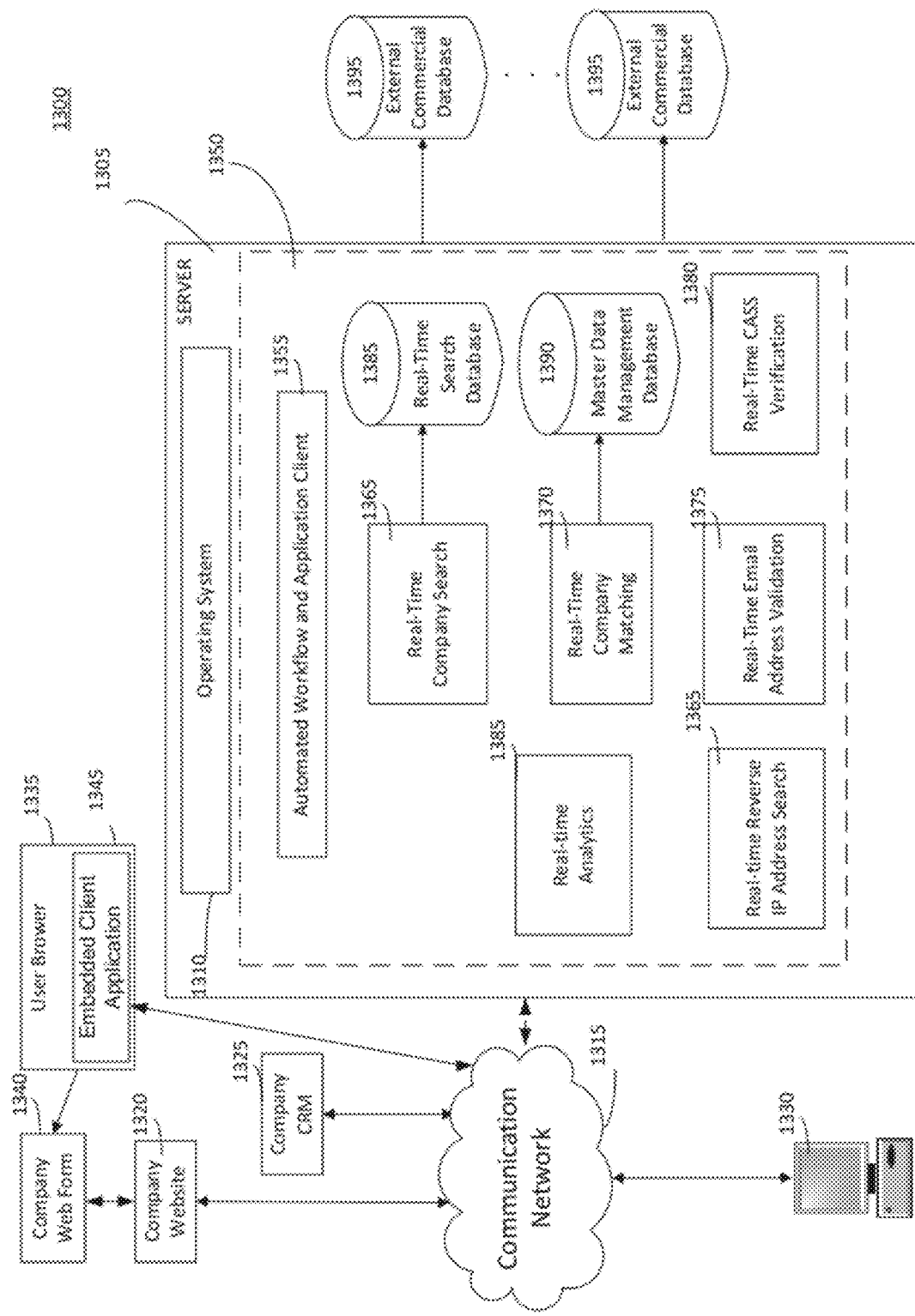
FIG. 13 depicts a computer system and network suitable for implementing the system and method of providing real time firmographic information based on minimal web form input.

FIG. 13 depicts a computer system and network 1300 suitable for implementing the system and method of providing real time firmographic information. A server computer 1305 includes an operating system 1310 for controlling the overall operation of the server 1305 which may connect through a communications network 1315 to a company's website 1320, a company's CRM system 1325 and, optionally to local computers 1330 with a user interface device. The company's website 1320 contains a customer or prospect (also known herein as a "visitor") web form 1340 that contains an embedded software code fragment or client application 1345 embedded within the user's browser 1335.

A visitor visits the company's website 1320 and opens a company web form 1340 that contains the embedded software client application 1345. The user's browser 1335 win load the JavaScript that runs the embedded application 1345. The server computer 1305 hosts a software as a service (SaaS) application 1345 comprising the real time firmographic analytic application 1350. The firmographic analytic application 1350 comprises multiple software applications including an automated workflow and application client 1355; a real-time reverse IP address search application 1365, a real-time company search application 1365, a real-time company matching application 1370, a real-time email address validation application 1375, a real-time coding Accuracy Support System (CASS) application 1380 and various other real-time analytics applications 1385 which could include heuristic engines, other known analytics or analytics as described herein. The firmographic analytic application 1350 also may include the embedded application client 1345 that resides within the company's web form 1340. A real-time search database 1385 allows for real-time searching of a visitor's company data using search algorithms by the firmographic analytic application 1350. The real-time search database 1385 is comprised of business records retrieved, developed and cleansed using records from within one or more external commercial database sources 1395. The real-time company matching application 1370 comprises a matching engine with statistical algorithms that matches company web form 1340 data entered by the visitor to the company's website 1320 with a master data management database 190 that contains commercial business company data.

The automated workflow application 1355 provides a configurable workflow that allows a company user to configure the firmographic analytic application 1350 off-line without the need for significant customer coding. The real-time company search function 1365 provides a module for utilizing a web visitor's company data and other data entered in a web form 1340 to be used in a multi-stage fuzzy search conducted using the real-time search database 1385. The attributes of the visitor's company are used to search the real-time search database 1385 which contains commercial company information that has been retrieved, developed and verified using external commercial databases 1395. The real-time company search utilizes fuzzy search matching that matches a pattern rather than requiring an exact match, although exact match and other types of search algorithms could also be used. Combinations of multiple input variables can be used which are all assigned unique precedence/weight values as configured by the automated workflow and application client function 1355 can be utilized by the fuzzy-search algorithm. The initial real-time company search 1365 may be highly targeted to one or more multiple input variables/attributes. The search results comprise a number of companies having the highest weighted scores on the closeness of the match to the search criteria. The actual number of company results to be returned is configurable by the automated workflow and application client. If no results are found in this initial search, subsequent searches use fewer and fewer company attributes for a broader search until a result set is found. When using the firmographic analytical application 1350, company search results may be presented to the visitor in an interactive select list allowing the visitor to select their exact company. This interactive select list is configurable allowing multiple display options including an inline drop-down mode which displays results with each key-stroke of the visitor and a modal confirmation dialog box mode which displays results once the visitor completes the form. Upon a visitor selecting a company presented in the select list, the selected company's firmographic data is provided to the company web form 1340 where it updates hidden fields created so that the real-time company search 1365 data results are available either to the visitor or to the company that owns the company website 1320.

Figure 14:
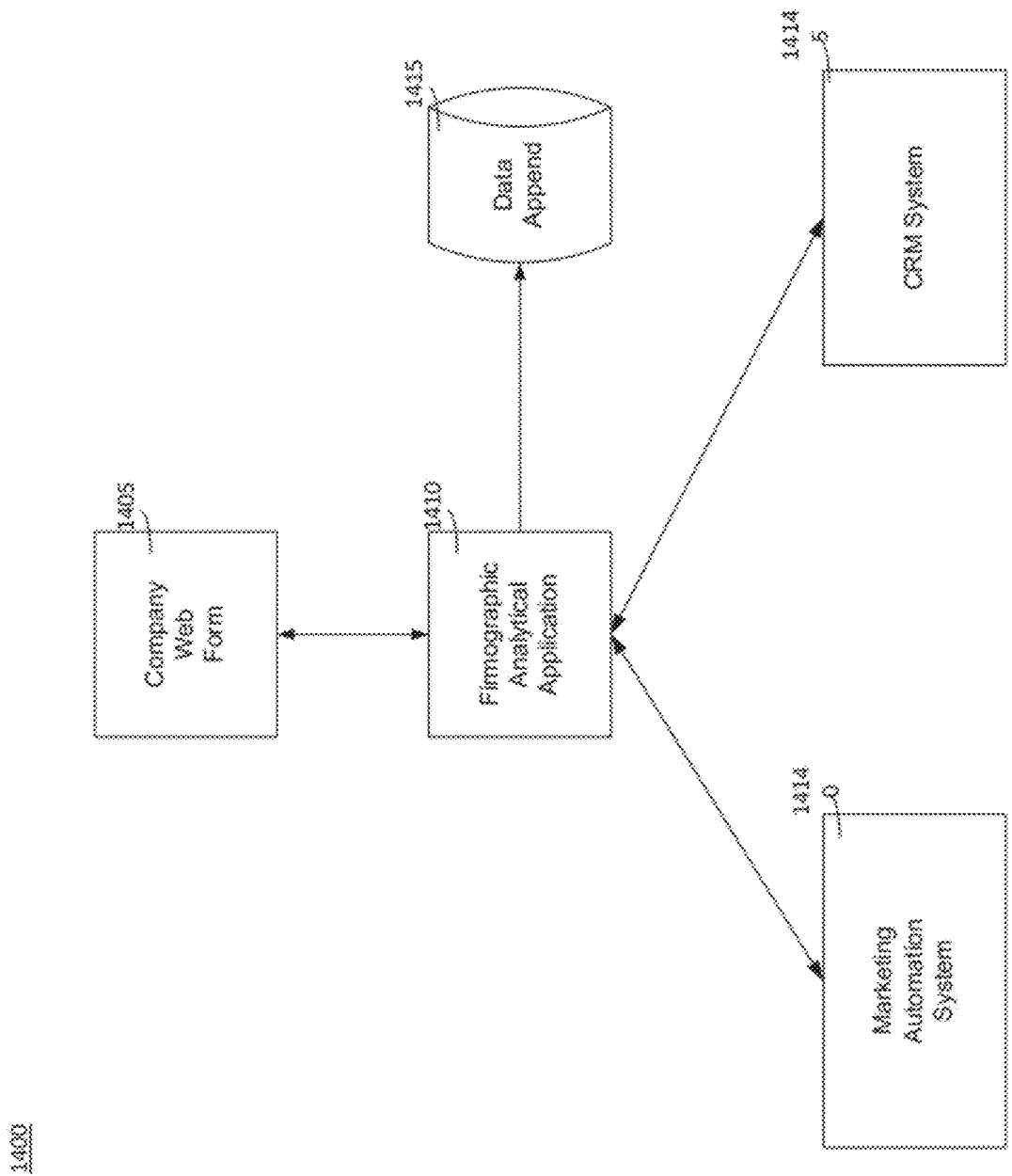
FIG. 14 is a block diagram showing the firmographic analytic application and its major interfaces.

FIG. 14 is a block diagram showing the firmographic analytic application and its major interfaces 1400. When a visitor accesses a company web form 1405, the firmographic analytical application 1410 (which may be hosted as a SaaS solution running on a remotely located server) is accessed and data is appended. 1415 to a web form 1405 as further disclosed herein. Standardized company firmographic data, such as physical address, industry, revenue range, employee size and the like are appended in real-time to the web form 1405 as the result of a successful search or match with data in a real-time search database FIG. 13, 1385 and a master data management database FIG. 13, 1390, allowing the results upon initial data entry to be immediately available to company customer's marketing automation systems 1420 and CRM systems 1425.

Figure 15A:
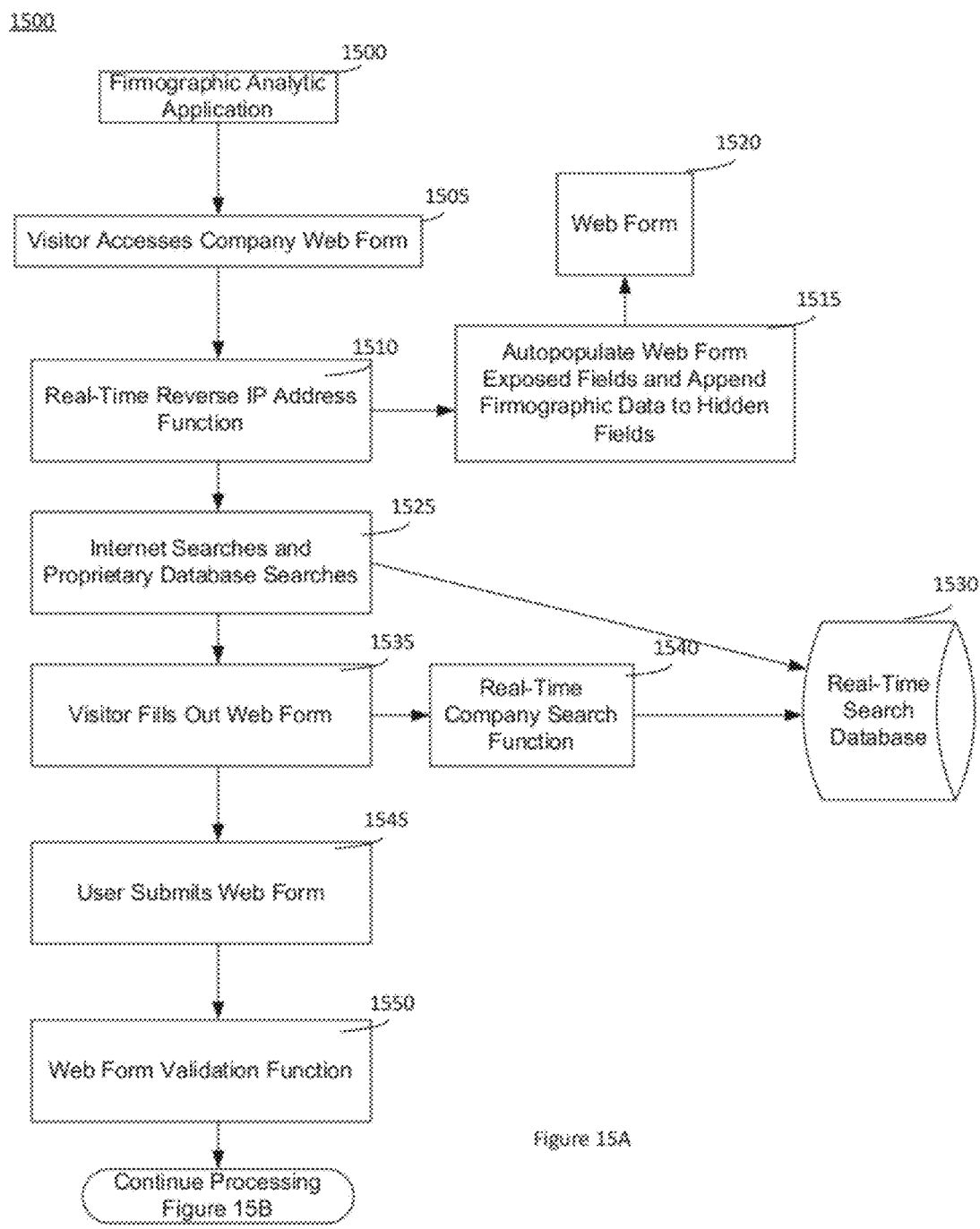
FIGS. 15A and 15B are flow charts of the firmographic analytical application processing.
Figure 15B:
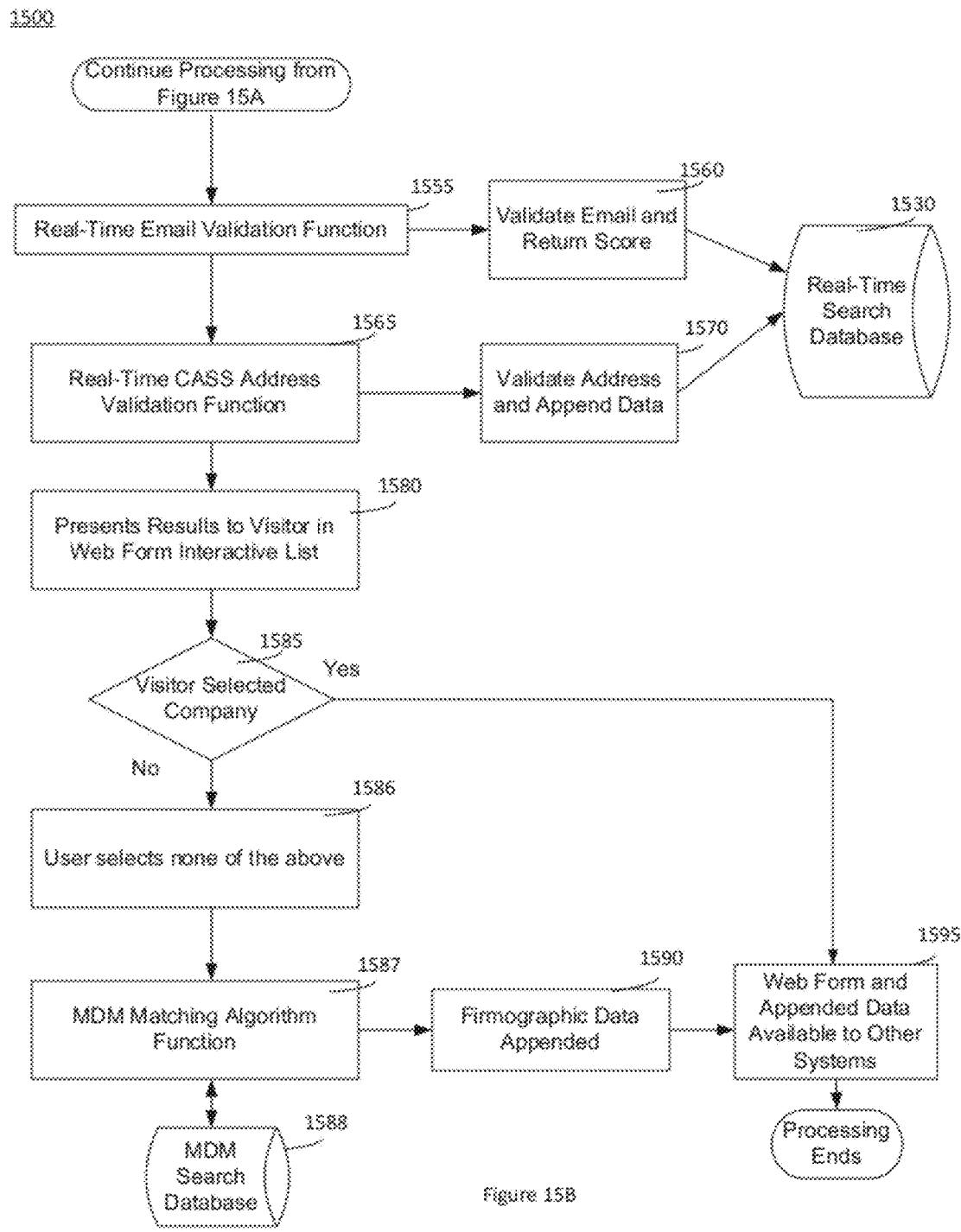

FIGS. 15A and 15B are flow charts of the firmographic analytical application processing 1500. When a visitor accesses a company website form 1505 is activated and the real-time reverie IP address search function 1510 is activated.

Figure 16:
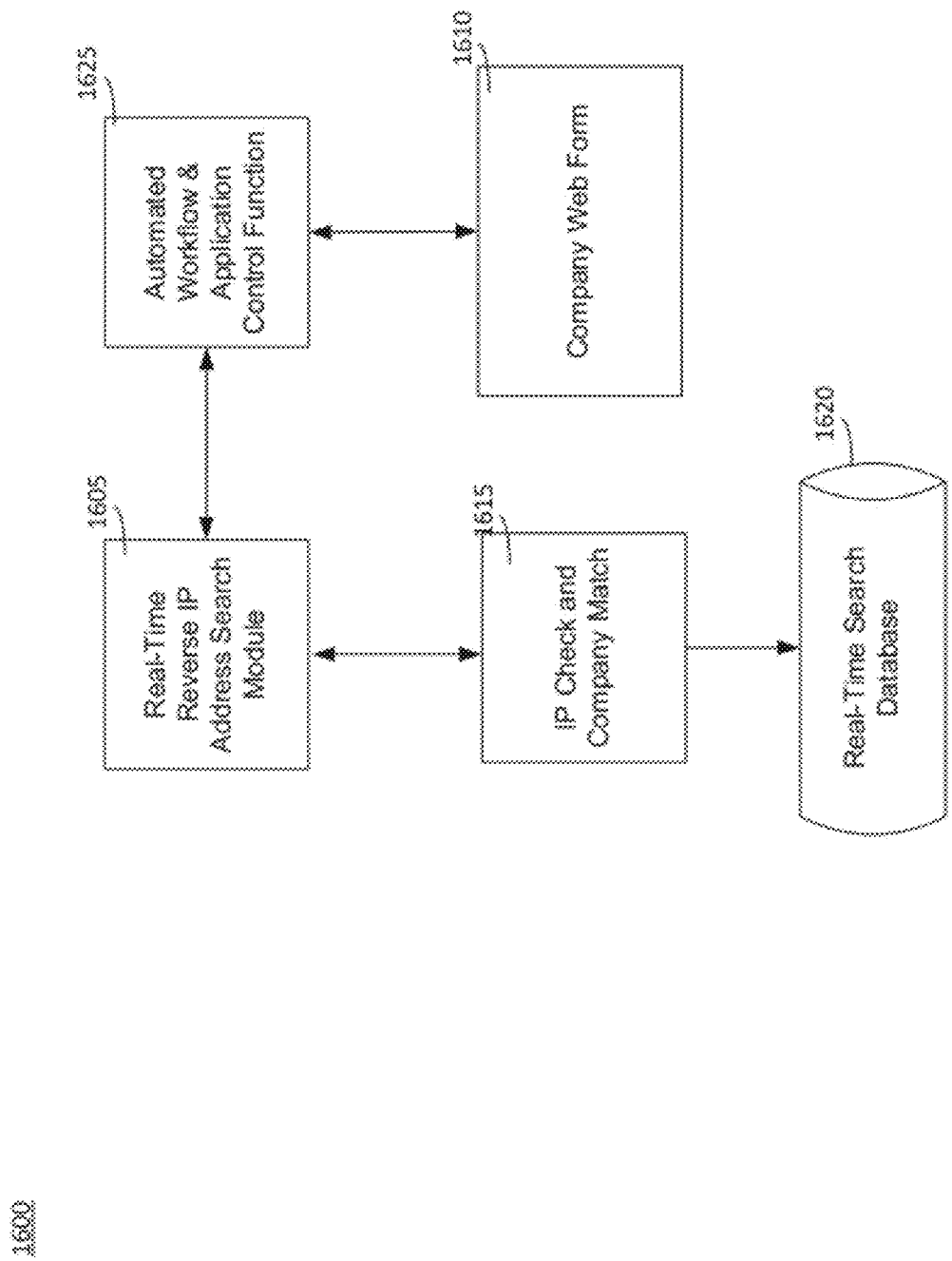

Turning now to FIG. 16, a flow chart of the reverse IP address search function 1600, the reverse IP address search function 1605 provides a module for detecting the IP address of a visitor accessing the company web form 1610 (FIG. 13, 1340) at a company website FIG. 13, 1320, reverse mapping that IP address to the visitor's company by doing an IP check and company match 1615 including searching a real-time search database 1620 having company IP addresses. Processing is controlled by the automated workflow and application control function 1625.

Turning back to FIG. 15A, the results of the reverse IP address search and the resulting company firmographic information having the particular IP address that corresponds to the web visitor who is entering data on that company web form 1520 is then used in real-time to automatically populate the company web form and append firmographic data to hidden and non-hidden fields 1515. This allows the company whose website is being visited FIG. 13, 1320 to auto-detect the visitor's company and auto-populate the company web form 1520 with data with or without direct interaction from the visitor. As part of the real-time reverse IP function 1510 internet searches are performed 1525 may occur.

As the visitor is filling out the web form 1535, the real-time company search function 1540 is activated to perform real-time search of databases 1530. Alternatively, the automated workflow (at the company's option) can perform the real-time search company search function 1540 after the user submits the webs form 1545.

Figure 17:
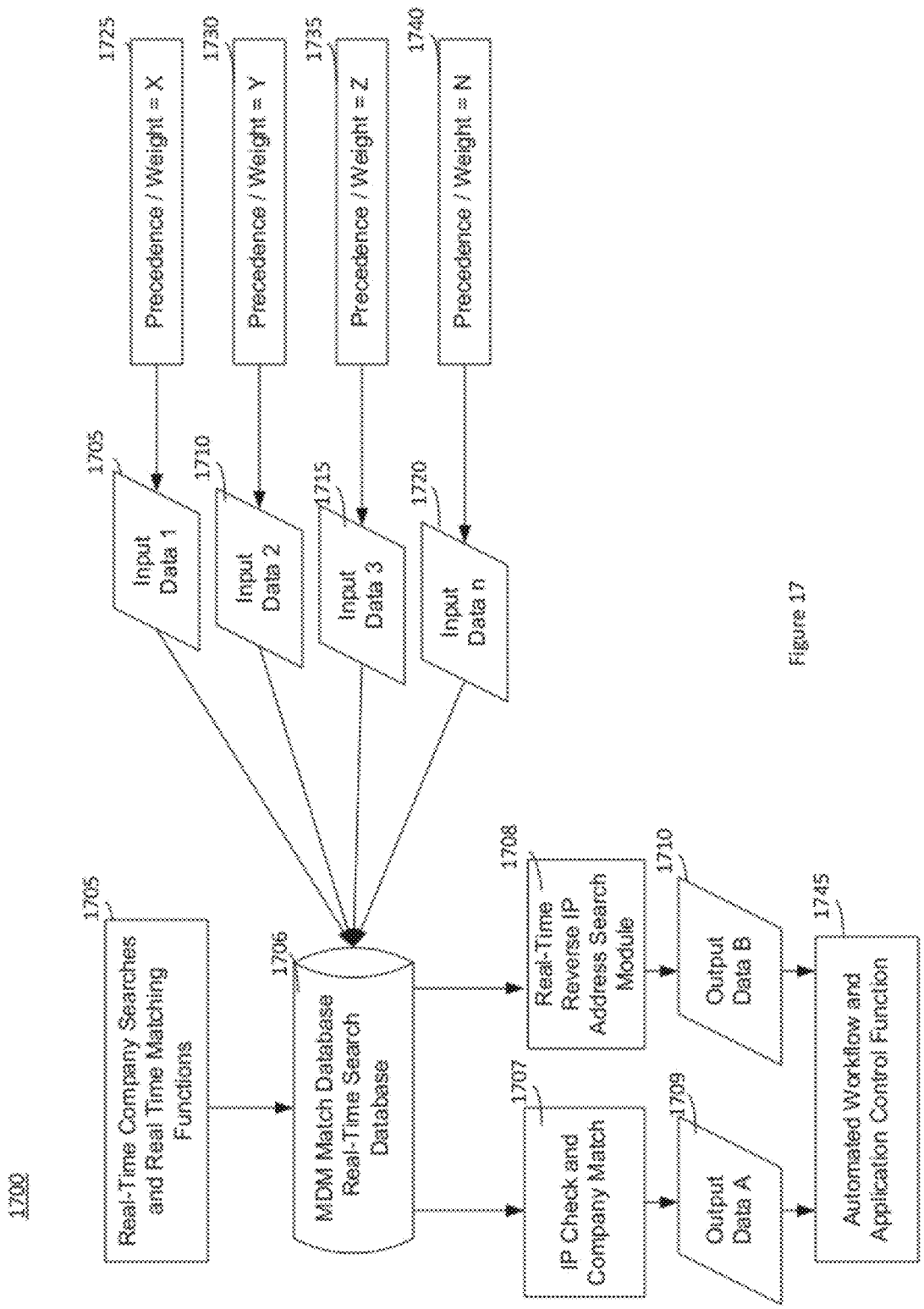
FIG. 17 shows a flow diagram of the real time company search function processing.

FIG. 17 shows a flow diagram of the real time company search function processing 1700. The real-time company search function 1705 is activated. Input data 1 through n 1705, 1710, 1715, 1720 that is input to a company web form by a visitor to the company website FIG. 15A 535 is each given a respective precedence and weight setting 1725, 1730; 1735, 1740 that is provided by the automated workflow function FIG. 13, 1355 when a user from the company sets up the firmographic analytic application FIG. 13, 1350. Alternatively, if the user has not set up the automated workflow FIG. 13, 1355 within the firmographic analytic application FIG. 13, 1350, then the precedence and weight settings 1725, 1730, 1735, 1740 will be default settings. The input data 1705, 1710, 1715, 1720 is used to perform real-time company searches of the real-time search database and master data management database 506 using search algorithms 1707, 1708 for real-time database searches. The output data A and B 1709, 1710 is then returned to the automated workflow and application control function 1745 which activates other modules to continue and complete the appending of firmographic data to the web form.

Turning back to FIG. 15A, when the user activates the web form submit button 1545 the web form validation processes 1550 continue on FIG. 15B. Depending upon the automated workflow settings, when the user activates the web form button 1545, the real-time company search function 1540 can also be performed. A real-time email address validation Module 1555 validates the email address by accessing the real-time search database 1530 and returns a validation score. The real-time email address validation module 1555 provides a module that utilizes an intelligent scoring-based proprietary set of Internet search techniques that provide for improved search results over commonly used Internet search techniques and generates a score for each email address that represents a measure of the validity of the respective email address.

The real-time CASS address verification function 1565 provides functionality that allows the address 1570 geographic attributes of each company to be validated against the real-time search database 1530 or other third party services to ensure accuracy and deliverability for direct mail.

The results of the processing describe in the firmographic analytic application 1500 is presented as an interactive select list 1580 that may be displayed to the user in the web form as an interactive select list of companies 1580. This interactive select list is configurable allowing multiple display options including an inline drop-down mode which displays results with each key-stroke of the visitor and a modal confirmation dialog box mode which displays results once the visitor completes the form. If the visitor selects one of the companies presented to the user as part of or ancillary to the web form 1585, the processing continues in step 1590. If the visitor does not select one of the companies presented to the visitor 1586 then a master data management function algorithm 1587 is activated and a master data management database is searched 1588 for a firmographic data best match. In step 1590, then the User selected firmographic data 1585 or the master data management function firmographic data is appended 1590 to the web form in hidden and unhidden fields. The form submission and appending process is how complete and the data is available for released to and use by applicable systems such as marketing automation systems, CRM systems or local databases 1595.

Figure 18:
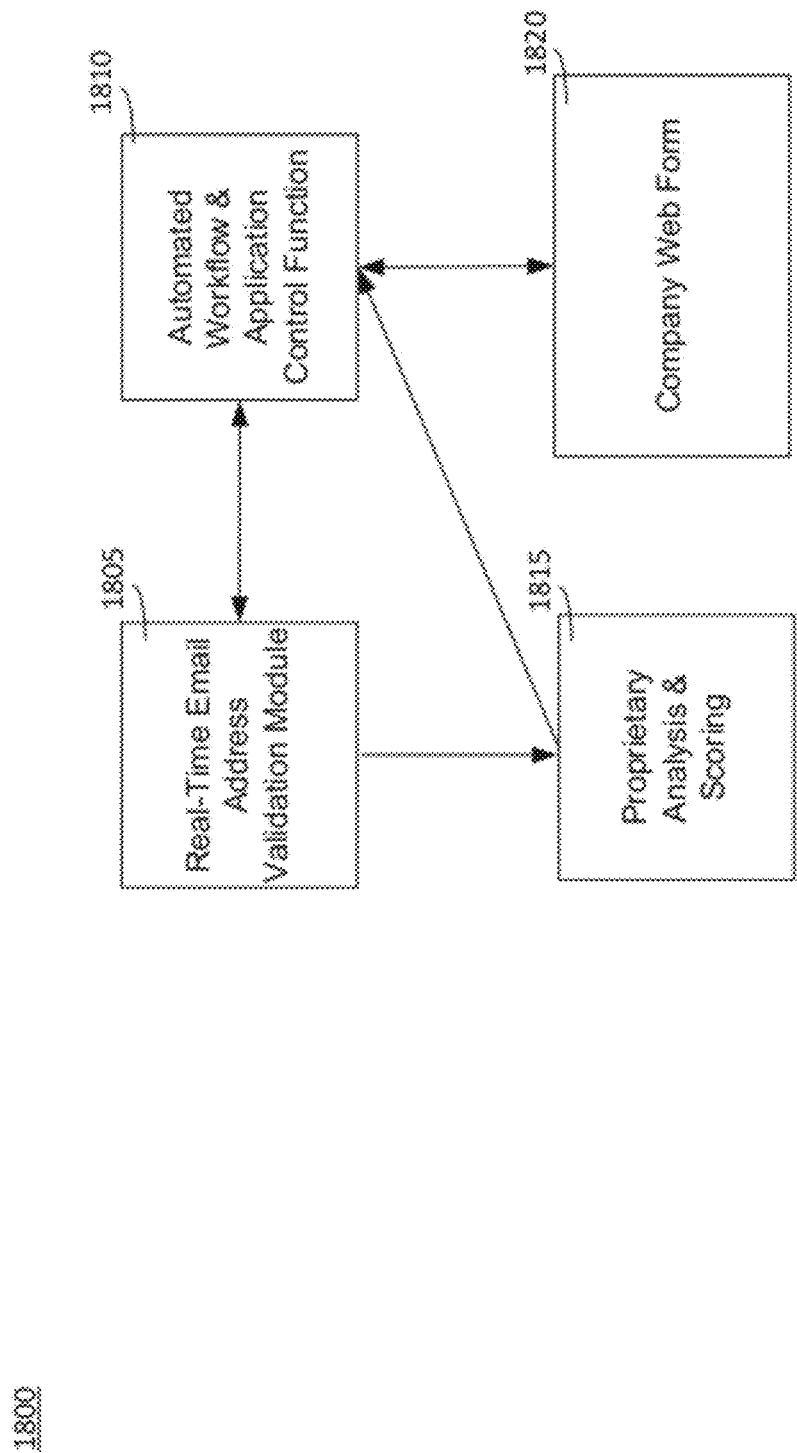
FIG. 18, a flow chart of the reverse IP address search function.

FIG. 18 shows a block diagram of the real-time address validation function 1805. A proprietary analysis and score of the validity of the email address is provided utilizing an intelligent scoring-based proprietary set of internet research techniques 1815. The score is returned and used in the company web form 1820. Processing is controlled by the automated workflow and application control function 1810.

Figure 19:
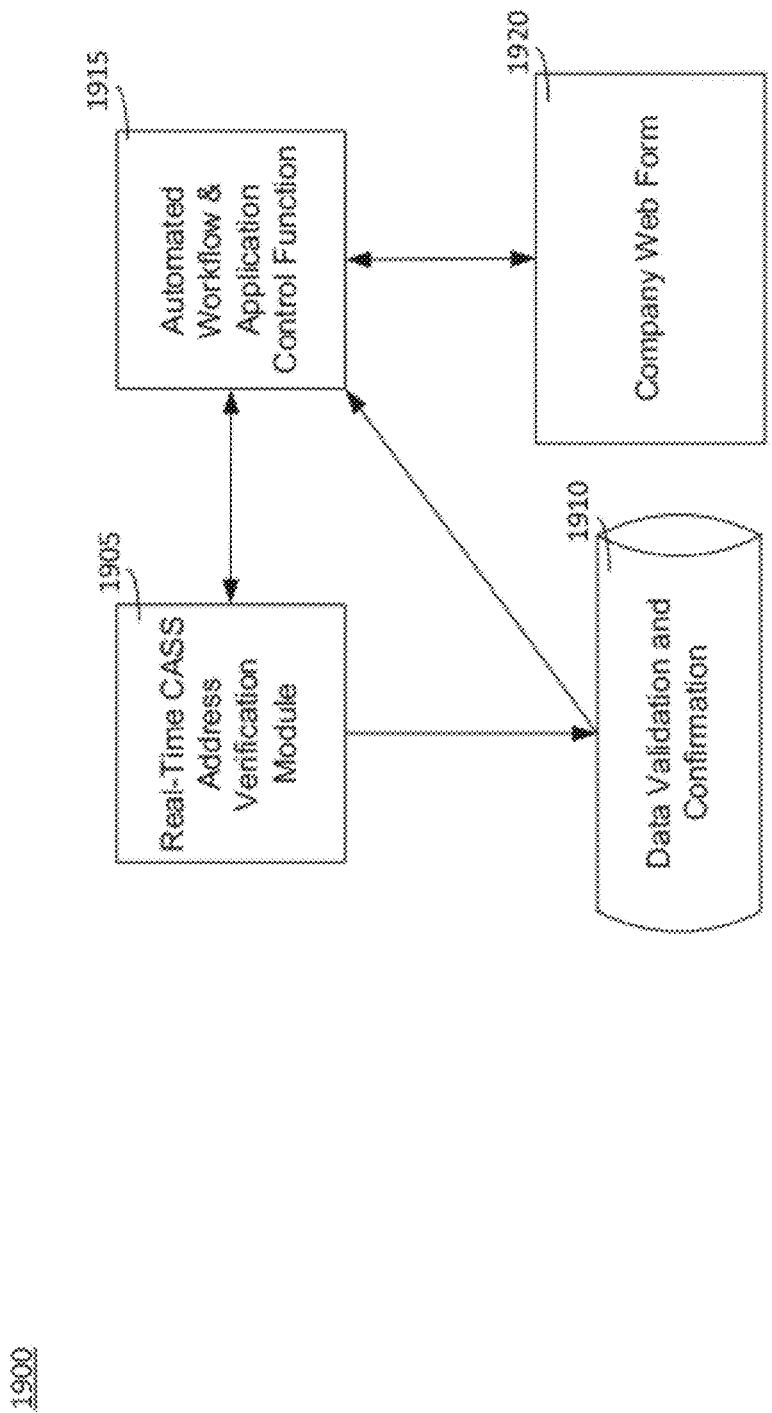
FIG. 19 shows a real-time Coding Accuracy Support System (CASS) application function.

FIG. 19 show a real-time Coding Accuracy Support System (CASS) application function 1900. The CASS module 1905 validates and confirms the validity of the physical address 1910 either input on the web form 1920 or obtained from third party databases or services. The geographic attributes of the web form information 1920 are validated against third party services to ensure accuracy and deliverability for direct mail. Processing is controlled by the automated workflow and application control function 1915.

Figure 20:
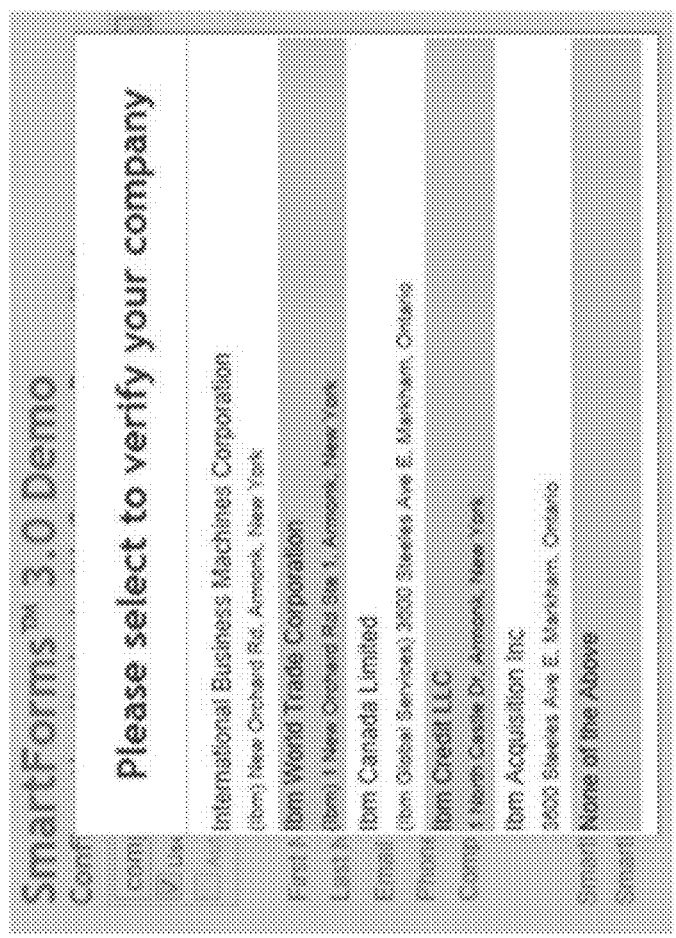
FIG. 20 is an exemplary depiction of a set of firmographic data that is the output of the process described in FIGS. 15A and 15B.

FIG. 20 is an exemplary depiction of a set of firmographic data 2000 that is the output of the process described in FIGS. 15A and 15B. The depiction in FIG. 20 represents data to be placed into a web form's hidden fields.

FIG. 21 is an exemplary depiction of the output of the real-time company matching function 2100 (described above in FIGS. 13, 15A, 15B and 17). It shows exemplary firmographic data that is the output of the processing described in FIGS. 15A, 15B and 17 and includes data from the visitor's selected company or resulting from an MDM matching algorithm and search. It may also represent data that may have been manually entered by the visitor. The depiction in FIG. 21 represents data that to be placed into a web form's hidden fields in real-time. Such information may be selected from the group consisting of: name, email address, company name, company address, company URL, number of employees, company annual revenue, SIC code data, NAICS data and a data confidence level. The data confidence level will comprise a confidence level that is based on whether the company data was entered by the visitor; if the match algorithms have returned a high score and therefore considered is a good match; if the match algorithms have returned a score that indicates that the match is a good match, but may have had fewer data fields upon which to conduct the match but results in a score that is still high enough to call a match; or a match failure because the match algorithms has returned low confidence level and is recommended that any match results not be considered accurate.

FIG. 22 is an exemplary depiction of the output of the real-time company matching function and real-time company search function 2200 (described above in FIGS. 13, 15A, 15B and 17). It shows exemplary firmographic data that is the output of the processing described in FIGS. 15A, 15B and 17. The depiction in FIG. 22 represents data that includes company and company affiliate information and related hierarchical company to be placed into a web form's hidden fields.

Although the present invention has been described in detail with reference to certain preferred embodiments, it should be apparent that modifications and adaptations to those embodiments might occur to persons skilled in the art without departing from the spirit and scope of the present invention.

The invention claimed is:

1. A computer implemented method for discovering, validating and outputting contact information using reversed internet protocol mapping and heuristic artificial intelligence, the computer implemented method comprising:

embedding, by a computer system, a tracking code fragment into a website;

automatically detecting, by the computer system, from the tracking code fragment, internet protocol addresses of visitors accessing the website;

reverse mapping, by the computer system, the internet protocol addresses of the visitors accessing the website to identify target companies to which the internet protocol addresses belong;

matching, by a weighted, multi-stage matching algorithm, executed by the computer system, each of the target companies with firmographic records stored in a master database;

aggregating, by the computer system, the firmographic records into cluster patterns;

sorting, filtering and pruning, by the computer system, the target companies based on the firmographic records;

detecting, by a proximity heuristic statistical distribution learning model, executed by the computer system, when a title of a contact in one the target companies correlates to a desired targeted role in excess of a minimum frequency threshold;

validating, by the computer system, an email address of the contact by real-time querying online social networks and calculating a validation score indicating a confidence level for the email address of the contact;

validating, by the computer system, a geographic address of the contact against third party services via a coding accuracy support system that corrects, matches, standardizes and confirms validity of the geographic address;

outputting, by the computer system, the validated contact, on a user interface.

2. The method of claim 1, further comprising auto-populating, by the computer system, a form of the website with the firmographic records.

3. The method of claim 2 wherein the auto-populating the form occurs without direct interaction from the visitors.

4. The method of claim 1, wherein the firmographic records comprise one or more of: an industry of the target companies, and a revenue range of the target companies.

5. The method of claim 1, further comprising identifying when the firmographic records were entered by an automated computer program.

6. The method of claim 5, wherein the automated computer program is a spambot.

7. The method of claim 1 wherein the validation score comprises values between 0 and 5.

8. A system for discovering, validating and outputting contact information using reversed internet protocol mapping and heuristic artificial intelligence, the system comprising a server computer configured for:

embedding, a tracking code fragment into a website;

automatically detecting, from the tracking code fragment, internet protocol addresses of visitors accessing the website;

reverse mapping, the internet protocol addresses of the visitors accessing the website to identify target companies to which the internet protocol addresses belong;

matching, by a weighted, multi-stage matching algorithm, each of the target companies with firmographic records stored in a master database;

aggregating, the firmographic records into cluster patterns;

sorting, filtering and pruning, the target companies based on the firmographic records;

detecting, by a proximity heuristic statistical distribution learning model, when a title of a contact in one the target companies correlates to a desired targeted role in excess of a minimum frequency threshold;

validating, an email address of the contact by real-time querying online social networks and calculating a validation score indicating a confidence level for the email address of the contact;

validating, a geographic address of the contact against third party services provided by a coding accuracy support system that corrects, matches, standardizes and confirms validity of the geographic address;

outputting, the validated contact, on a user interface.

9. The system of claim 8, wherein the server computer is further configured for auto-populating, a form of the website with the firmographic records.

10. The system of claim 9 wherein the auto-populating the form occurs without direct interaction from the visitors.

11. The system of claim 8, wherein the firmographic records comprise one or more of: an industry of the target companies, and a revenue range of the target companies.

12. The system of claim 8, wherein the validation score comprises values between 0 and 5.

\* \* \* \* \*